(12) United States Patent
Jurado et al.

(10) Patent No.: US 12,488,115 B2
(45) Date of Patent: Dec. 2, 2025

(54) SYSTEMS AND METHODS FOR ANALYZING CYBERSECURITY THREAT SEVERITY USING MACHINE LEARNING

(71) Applicant: Capital One Services, LLC, McLean, VA (US)

(72) Inventors: Jonathan Jurado, Baltimore, MD (US); Robert McLean, McLean, VA (US); Dominic Ritchey, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 379 days.

(21) Appl. No.: 18/156,450

(22) Filed: Jan. 19, 2023

(65) Prior Publication Data

US 2023/0229785 A1 Jul. 20, 2023

Related U.S. Application Data

(60) Provisional application No. 63/266,966, filed on Jan. 20, 2022.

(51) Int. Cl.
*G06F 21/57* (2013.01)
*G06F 3/0483* (2013.01)
(52) U.S. Cl.
CPC .......... *G06F 21/577* (2013.01); *G06F 3/0483* (2013.01)

(58) Field of Classification Search
CPC ............................ G06F 21/577; G06F 3/0483
See application file for complete search history.

(56) References Cited

U.S. PATENT DOCUMENTS

| | | | |
|---|---|---|---|
| 10,387,657 B2 | 8/2019 | Belfiore et al. | |
| 10,404,737 B1 | 9/2019 | Sweeney et al. | |
| 10,887,335 B2 | 1/2021 | Pilkington et al. | |
| 10,904,282 B2 | 1/2021 | Kibler et al. | |
| 10,965,706 B2 * | 3/2021 | Harris | H04L 67/61 |
| 2020/0057851 A1 * | 2/2020 | Agarwal | G06F 30/20 |
| 2020/0228563 A1 | 7/2020 | Yampolkskiy et al. | |
| 2020/0329068 A1 | 10/2020 | Findlay | |
| 2021/0173924 A1 * | 6/2021 | Trost | G06F 16/288 |

* cited by examiner

*Primary Examiner* — Sm A Rahman
(74) *Attorney, Agent, or Firm* — Bookoff McAndrews, PLLC

(57) ABSTRACT

A method for cybersecurity threat actor severity scoring, the method comprising: receiving public data that includes publicly available information obtained via monitoring of a data connection between one or more networks; parsing first data related to a cybersecurity event from the public data; associating the first data with a first threat actor; obtaining second data that includes information regarding one or more previous cybersecurity events associated with the first threat actor; determining a first threat actor score based on the first data and the second data; receiving a second threat actor score for a second threat actor; causing a graphical user interface to display a graphical depiction of a ranking of the first threat actor and the second threat actor based on the first threat actor score and the second threat actor score.

20 Claims, 12 Drawing Sheets

MASTER COPY: TOP TEN THREAT ACTORS
INTEGRATED WITH THE MONTHLY INTEL EXCHANGE SLIDES

LAST UPDATED: 4/15/2021

| THREAT ENTITY | THREAT ACTOR | COUNTRY | OVERALL SCORE | BREAKDOWN | SCORECARD | DYNAMIC PROFILE |
|---|---|---|---|---|---|---|
| RANSOMWARE GROUP | ROGUE ACTOR | MULTIPLE | 0.000 | 0.722 | ROGUE ACTOR | ROGUE ACTOR |
| | THREAT O | | | 0.494 | THREAT O | THREAT O |
| | THREAT P | | | 0.000 | THREAT P | THREAT P |
| | THREAT Q | | | 0.548 | THREAT Q | THREAT Q |
| ENTITY CC | THREAT G, THREAT F | COUNTRY BBB | 0.134 | 0.198 | THREAT G | THREAT G |
| | | | | 0.134 | THREAT F | THREAT F |
| ENTITY DD | THREAT H, THREAT I, THREAT J | COUNTRY CCC | 0.134 | 0.134 | THREAT H | THREAT H |
| | | | | 0.186 | THREAT I | THREAT I |
| | | | | 0.260 | THREAT J | THREAT J |

*FIG. 7*

INTEL HOME / ≔ ALL EVENTS — 810

EVENT LISTS

| | 800 | | |
|---|---|---|---|
| 🔍 SEARCH 1104 EVENTS. SEPARATE SEARCH TERMS WITH COMMAS. PRESS ENTER TO SEARCH. — 815 | | + CREATE EVENT — 830 | ⬇ EXPORT CSV — 835 |

ALL EVENTS — 820    EARLY BIRD EVENTS — 825

| STATUS ⇕ | CREATED DATE ⇕ — 842 | SUMMARY ⇕ — 850 | TYPE ⇕ — 870 | REFERENCE — 860 |
|---|---|---|---|---|
| 🔍 VIEW  MONITORING — 840/880 | JAN 20, 2022 | LOREM IPSUM DOLOR SIT AMET, CONSECTETUR | VITAE CONGUE | VIEW SOURCE ⧉ |
| 🔍 VIEW  MONITORING | JAN 20, 2022 | ADIPISCING ELIT, SED DO EIUSMOD TEMPOR | EU CONSEQUAT | VIEW SOURCE ⧉ |
| 🔍 VIEW  MONITORING | JAN 19, 2022 | INCIDIDUNT UT LABORE ET DOLORE MAGNA ALIQUA | AC VEHICULA | VIEW SOURCE ⧉ |
| 🔍 VIEW  MONITORING | JAN 19, 2022 | UT ENIM AD MINIM VENIAM | IPSUM A ARCU | VIEW SOURCE ⧉ |
| 🔍 VIEW  MONITORING | JAN 19, 2022 | QUIS NOSTRUD EXERCITATION ULLAMCO LABORIS | CURSUS VITAE | VIEW SOURCE ⧉ |
| 🔍 VIEW  MONITORING | JAN 19, 2022 | ALIQUIP EX EA COMMODO CONSEQUAT | CONGUE MAURIS | VIEW SOURCE ⧉ |
| 🔍 VIEW  MONITORING | JAN 11, 2022 | DUIS AUTE IRURE DOLOR IN REPREHENDERIT IN | RHONCUS AMET | VIEW SOURCE ⧉ |
| 🔍 VIEW  MONITORING | JAN 11, 2022 | VOLUPTATE VELIT ESSE CILLUM DOLORE EU FUGIAT | NISL SUSCIPIT | VIEW SOURCE ⧉ |
| 🔍 VIEW  MONITORING | JAN 07, 2022 | NULLA PARIATUR EXCEPTEUR SINT OCCAECAT | ADIPISCING BIBEND | VIEW SOURCE ⧉ |
| 🔍 VIEW  MONITORING | JAN 05, 2022 | CUPIDATAT NON PROIDENT, SUNT IN CULPA | UM EST ULTRICIES | VIEW SOURCE ⧉ |
| 🔍 VIEW  MONITORING | JAN 04, 2022 | QUI OFFICIA DESERUNT MOLLIT ANIM ID EST LABO | INTEGER NISL NUNC | INTEL VENDOR |
| 🔍 VIEW  MONITORING | DEC 28, 2021 | LOREM IPSUM DOLOR SIT AMET, CONSECTETUR | MI IPSUM FAUCIBUS | VIEW SOURCE ⧉ |
| 🔍 VIEW  MONITORING | DEC 23, 2021 | ADIPISCING ELIT, SED DO EIUSMOD TEMPOR | VITAE ALIQUET | VIEW SOURCE ⧉ |
| 🔍 VIEW  MONITORING | DEC 23, 2021 | INCIDIDUNT UT LABORE ET DOLORE MAGNA ALIQUA | NEC ULLAMCORPER | VIEW SOURCE ⧉ |
| 🔍 VIEW  MONITORING | DEC 22, 2021 | UT ENIM AD MINIM VENIAM | SIT VIVERRA | VIEW SOURCE ⧉ |

⌂ INTEL HOME / ≡ ALL EVENTS / 🗐 EVENT DETAILS

910 — 🗐 EVENT DETAILS ⊙

920 — ACTIONS
✓ SUBSCRIBE TO THIS EVENT | 🔔 MANAGE EVENT SUBSCRIPTIONS
✏ EDIT EVENT METADATA | ⊕ ADD EVENT NOTES | ⊕ CREATE A PRODUCT
» CLOSE EVENT
🗄 ARCHIVE EVENT

930 — LINKED EVENTS ⊙
PRECEDING EVENTS
EVENT 1098
APACHE LOG4J ZERO DAY - UNDER ACTIVE ATTACK
EVENT 1112
LOG4J CVE-2021-45046
EVENT 1113
LOG4J CVE-2021-45105
EVENT 1119

940 — DETAILS
STATUS
MONITORING
ARCHIVED?
⊗ FALSE
JIRA ISSUE
CYBTI-8438
TITLE
PELLENTESQUE DIGNISSIM ENIM SIT AMET VENENATIS
URNA MASSA SED ELEMENTUM TEMPUS
SOURCE / REFERENCE
EXCEPTEUR SINT OCCAECAT CUPIDATAT NON PROIDENT
SUNT IN CULPA QUI OFFICIA DESERUNT MOLLIT ANIM ID
SENSITIVE EVENT?
⊗ FALSE
DESCRIPTION
LOBORTIS FEUGIAT VIVAMUS AT AUGUE EGET ARCU DICT
UM VARIUS. EUISMOD IN PELLENTESQUE MASSA PLACE
DUIS ULTRICIES LACUS. QUIS VIVERRA NIBH CRAS
PULVINAR MATTIS NUNC

CREATED DATE
MAY 30, 2021, 14:28:43 EST
REPORTED BY
JONATHAN JURADO ⊙
ASSIGNED ANALYST
JONATHAN JURADO ⊙
MANAGER / EVENT OWNER
ROBERT MCLEAN ⊙

STATUS
⊗ FALSE

HISTORY
○ JUN. 06, 2021, 3:20AM - LOREM
   IPSUM DOLOR SIT AMET
   CONSECTETUR ADIPISCING ELIT
   UT ENIM AD MINIM VENIAM, QUIS
   NOSTRUD EXERCITATION
   ULLAMCO LABORIS NISI UT
   ALIQUIP EX EA COMMODO
○ MAY 31, 2021, 7:44 AM - SED DO
   EIUSMOD TEMPOR INCIDIDUNT
   CONSEQUAT. DUIS AUTE IRURE
○ MAY 30, 2021, 1:10 AM - UT
   LABOR ET DOLORE MAGNA

SYSTEMS AND METHODS FOR ANALYZING CYBERSECURITY THREAT SEVERITY USING MACHINE LEARNING

CROSS-REFERENCE TO RELATED APPLICATION(S)

This application claims the benefit of priority to U.S. Provisional Application No. 63/266,966, filed Jan. 20, 2022, which is incorporated herein by reference in its entirety.

TECHNICAL FIELD

Various embodiments of this disclosure relate generally to cybersecurity defense, and, more particularly, to systems and methods for monitoring and evaluating cybersecurity threat actor risk severity using machine learning.

BACKGROUND

Cybersecurity threat actors generally leverage various techniques to target organizations such as financial institutions and government agencies. State-sponsored threat actors and sophisticated cybercriminals are often able to execute mass compromise campaigns through techniques such as supply chain exploitation, authentication token forgery, data encryption and exfiltration, software vulnerability exploitations, and DNS tunneling.

Sophisticated enterprise cybersecurity teams customarily monitor threats and prioritize defenses by identifying key threats and/or risks to their particular enterprise or organization. These key threats and/or risks are often determined based on institutional knowledge or similar systems. However, conventional techniques, including the foregoing, are resource intensive and not necessarily backed by data. There exists a need to provide a defensible approach to identifying top threats to an organization in a data-centric, analyst-friendly approach that reduces burden on analytical resources while providing data backed by decisioning in an intuitive manner. There further exists a need to provide a data-centric approach to identifying top threats to an organization which reduces burden on analytical resources, enables full traceability from the source data to the analysis, and intuitively advises defensible, operational, tactical, and strategic decisions.

This disclosure is directed to addressing one or more of the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for cybersecurity threat actor severity scoring, and more particularly training and using machine learning models to perform activities such as analyzing cybersecurity event information and generating one or more threat actor scores for a threat actor. Each of the examples disclosed herein may include one or more of the features described in connection with any of the other disclosed examples.

There is a technical need for an improved method for monitoring and analyzing automated data collection for relevant cybersecurity information. There is further a technical need for an improved graphical user interface ("GUI") for presenting threat actor information that is simpler and easier to use. There is additionally a technical need for an improved scoring system for threat actor severity risk that more accurately determines the risk of a threat actor to a specific organization in an automated manner, for example, using improved machine learning techniques described herein. The systems and methods disclosed herein provide a technical solution to one or more of these and other technical problems associated with analyzing publicly available information and/or training a machine learning engine to parse public data for information relevant to a threat actor score in order to, for example, improve the data collection process and reduce burden on cybersecurity analysts. Aspects of this disclosure may result in a better method of generating scores for determining a threat actor risk based on a number of relevant factors, including for example the intent, capability, volume, and recency of cybersecurity events, internal data obtained from security testing team emulations of cybersecurity events, and coverage/protection against that threat actor.

In one aspect, an exemplary embodiment of a method for cybersecurity threat actor severity scoring may include: receiving public data that includes publicly available information obtained via monitoring of a data connection between one or more networks; parsing first data related to a cybersecurity event from the public data; associating the first data with a first threat actor; obtaining second data that includes information regarding one or more previous cybersecurity events associated with the first threat actor; determining a first threat actor score based on the first data and the second data; receiving a second threat actor score for a second threat actor; causing a graphical user interface to display a graphical depiction of a ranking of the first threat actor and the second threat actor based on the first threat actor score and the second threat actor score.

In another aspect, an exemplary embodiment of a method for training a machine-learning model for cybersecurity threat actor severity scoring may include: receiving public data that includes publicly available information obtained via monitoring of a data connection between one or more networks; parsing first data related to a cybersecurity event from the public data; associating the first data with a first threat actor; obtaining second data that includes information regarding one or more previous cybersecurity events associated with the first threat actor; determining a first threat actor score based on the first data and the second data; receiving a second threat actor score for a second threat actor; causing a graphical user interface to display a graphical depiction of a ranking of the first threat actor and the second threat actor based on the first threat actor score and the second threat actor score; causing the graphical user interface to display a window comprising a plurality of selectable tabs, wherein each of the plurality of selectable tabs corresponds to one or more cybersecurity modules; and further causing the graphical user interface to display a selectable graphical icon corresponding to the first threat actor; and upon receiving a user input on the selectable graphical icon, causing, via the one or more processors, the graphical user interface to display a window depicting one or more of: the first threat actor score; a listing of prior cybersecurity events associated with the first threat actor; a first threat actor profile comprising additional first threat actor information; and a graphical depiction of a ranking of the first threat actor and the second threat actor based on the first threat actor score and the second threat actor score.

In a further aspect, an exemplary embodiment of a system for cybersecurity threat actor severity scoring may include: a memory storing instructions; and a processor operatively connected to the memory and configured to execute the instruction to perform operations. The operations may include: receiving information regarding a plurality of threat actors; determining a threat actor score for each threat actor of the plurality of threat actors; receiving public data that includes publicly available information obtained via monitoring of a data connection between one or more networks; parsing first data related to a cybersecurity event from the public data; associating the first data with a first threat actor of the plurality of threat actors; obtaining second data that includes information regarding one or more previous cybersecurity events associated with the first threat actor; receiving third data that includes additional information associated with the first threat actor; generating, via a trained machine learning model executed by the one or more processors and based on the third data, a first threat actor score associated with the first threat actor based on the first data, the second data and the third data, wherein the trained machine learning model is trained based on (i) fourth data that includes information comprising one or more threat actors and one or more prior cybersecurity events as test data and (ii) fifth data that includes one or more threat actor scores corresponding to the one or more threat actors and one or more prior cybersecurity events associated with the one or more threat actors, to learn associations between the test data and the corresponding threat actor score for each of the one or more threat actors, such that the trained machine learning model is configured to determine the first threat actor score associated with the threat actor in response to input of the third data and the cybersecurity event; generating a ranked list of the plurality of threat actors based on the determined threat actor score for each of the plurality of threat actors and the updated first threat actor score; and causing the graphical user interface to display graphical depictions of the ranked list.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 7 depicts a graphical user interface displaying another ranking of threat actors based on one or more threat actor scores, according to one or more embodiments.

FIG. 8 depicts a graphical user interface displaying a threat actor events list, according to one or more embodiments.

FIG. 9 depicts a graphical user interface displaying a threat actor event details page, according to one or more embodiments.

DETAILED DESCRIPTION OF EMBODIMENTS

Figure 1:
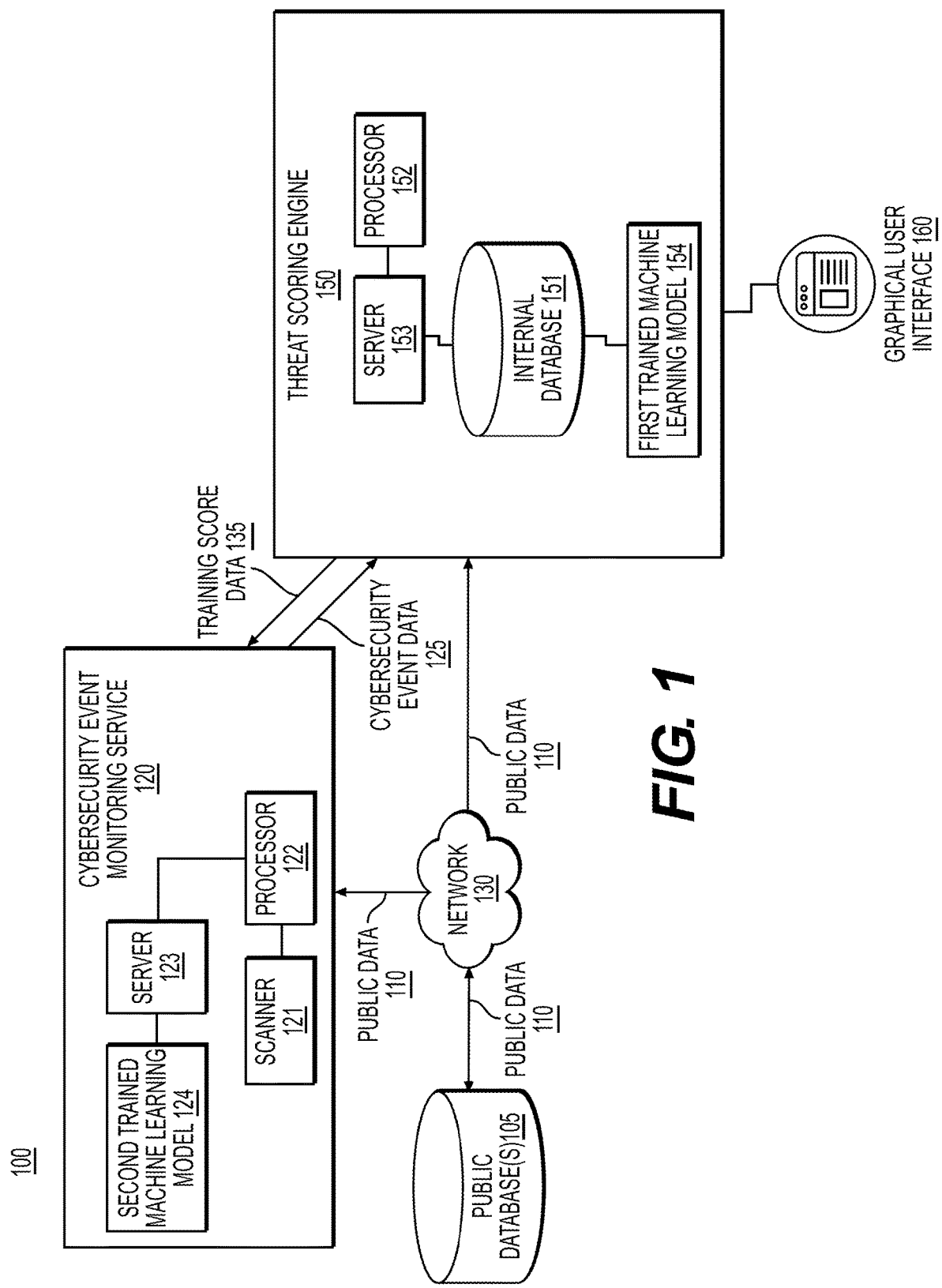
FIG. 1 depicts an exemplary environment for monitoring and evaluating cybersecurity threat actor risk severity, according to one or more embodiments.

According to certain aspects of the disclosure, methods and systems are disclosed for monitoring and evaluating cybersecurity threat actor risk severity, e.g., scoring and ranking cybersecurity threat actors in order to better prioritize enterprise cybersecurity defense resources. Because the cybersecurity threat landscape is rapidly evolving, sophisticated enterprise cybersecurity teams generally need to actively and regularly monitor threat actors and prioritize defenses by identifying key threats and/or risks to the particular enterprise or organization they are defending. However, conventional techniques may not be suitable. For example, conventional techniques may not be agile at responding to recent or ongoing events or rapidly changing circumstances. Further, conventional techniques may not organize and present threat risk in a user-friendly or intuitive manner that improves the ability of a user to quickly understand the risk severity of a set of threat actors and obtain relevant information associated with those threat actors. Accordingly, improvements in technology relating to monitoring and evaluating cybersecurity threat actor risk severity using machine learning in particular are needed.

As will be discussed in more detail below, in various embodiments, systems and methods are described for monitoring and evaluating cybersecurity threat actor risk severity, e.g., by using machine learning techniques. For example, by training a machine-learning model, e.g., via supervised or semi-supervised learning, to learn associations between risk information corresponding to one or more threat actors data and information regarding one or more threat actors and a prior threat actor score for each of the one or more threat actors as test data, the trained machine-learning model may be usable to determine relevant risk information associated with a first threat actor in response to input of risk information in a public data set associated with the first threat actor and a first threat actor score for the first threat actor. Similarly, by training a machine-learning model, e.g., via supervised or semi-supervised learning, to learn associations between risk information data corresponding to one or more threat actors and data including information regarding one or more threat actors and a prior threat actor score for each of the one or more threat actors data, the trained machine-learning model may be usable to update a threat actor score for a threat actor in response to input of risk information in a public data set and a cybersecurity event associated with the threat actor. Further, a trained-machine learning model may also be trained based on risk information data and prior threat actor and threat actor score information to visualize historical changes in the threat actor score over time and provide further insights (e.g., upward trends or downward trends) for particular threat actors or groups of threat actors.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of ±10% of a stated or understood value.

Terms like "organization," "enterprise," "government agency," or the like generally encompass an entity or person that possess or interacts with electronic data and is subject to cybersecurity attacks and/or events, as well as an agent or intermediary of such an entity or person. As used herein, terms like "user" generally encompasses any person or entity that may seek to monitor threat actors or respond or prevent cybersecurity attacks and/or events. As used herein, terms such as "cybersecurity event" or "cybersecurity attack" or the like generally encompass any event or occurrence that relates to cybersecurity, for example, a data breach, a cyberattack, fraudulent activity, or other activity of interest to the digital security of an organization. Terms such as "threat actor," "threat entity" or the like encompass any person, entity, or group of entities that engages in, perpetrates, or causes cybersecurity attacks and/or cybersecurity events.

As used herein, a "machine-learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of the machine-learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

In an exemplary use case, data related to a cybersecurity event (for example, a data breach) may be obtained via monitoring of a public data connection between one or more networks. Based on the data related to the cybersecurity event, additional data related to a threat actor associated with the cybersecurity event may be obtained. Based on the data related to the cybersecurity event and any obtained additional data related to the threat actor, one or more threat actor scores (for example, an overall composite threat score, a capability score or an intent score) may be determined for the threat actor. Threat actor scores for additional threat actors may be determined in this manner, such that a graphical user interface may be configured to display a ranking of the threat actors by the threat actor scores.

In another exemplary use case, a machine learning model may be trained to parse one or more public data sets (e.g., publicly available information) to find relevant risk information associated with the first threat actor for determining or updating one or more threat actor scores associated with the threat actor. Using the one or more threat actor scores, a graphical user interface may be generated that displays a ranking of a plurality of threat actors based on the one or more threat actor scores. In this manner, the parsing of relevant information to the threat actor scores is automated in order to, for example, reduce burden on cybersecurity teams and more quickly and accurately generate threat actor scores with minimal user input. In some embodiments, a certain threat actor may be automatically monitored, such that when the threat actor score exceeds a pre-determined threshold following a cybersecurity event, a notification may be generated and sent to a user device. More specifically, as new inputs are being associated with a threat actor (e.g., new cybersecurity events), the input may be entered into a scorecard either manually by a user or automated for further review. Once reviewed, the input may then be factored into the threat actor score for the associated threat actor. The notification in some embodiments may further be tuned to a user's preferences or turned on/off by the user to prevent spamming of notifications.

In another exemplary use case, a machine-learning model may be trained to generate or update a threat actor score for a threat actor based on information received relating to the threat actor. For example, upon receipt of a new cybersecurity event related to a threat actor, the machine-learning model may automatically generate a threat actor score for the threat actor based on the new cybersecurity event. If a threat actor score was previously generated, then the machine-learning model may be trained to provide an updated score. The updated score may be used to display, via a graphical user interface, a ranking of a plurality of threat actors. This ranking of the plurality of threat actors and other threat actor score information may be visualized and presented in an improved manner that better allows users to understand comparative trends between the ranked plurality of threat actors. In this manner, insights may be developed and presented that will inform better decision making by cybersecurity teams based on the historical data visualized using the machine-learning model.

While several of the examples above involve cybersecurity threat actor scoring, it should be understood that techniques according to this disclosure may be adapted to any suitable type of entity scoring. It should also be understood that the examples above are illustrative only. The techniques and technologies of this disclosure may be adapted to any suitable activity.

Presented below are various aspects of machine learning techniques that may be adapted to monitor and evaluate cybersecurity threat actor risk severity. As will be discussed in more detail below, machine learning techniques adapted to parse cybersecurity event data from public information and generate one or more threat actor scores for one or more threat actors may include one or more aspects according to this disclosure, e.g., a particular selection of training data, a particular training process for the machine-learning model, operation of a particular device suitable for use with the trained machine-learning model, operation of the machine-learning model in conjunction with particular data, modification of such particular data by the machine-learning model, etc., and/or other aspects that may be apparent to one of ordinary skill in the art based on this disclosure.

FIG. 1 depicts an environment 100 that may be utilized with techniques presented herein. In some embodiments, public database(s) 105 may communicate public data 110 across an electronic network 130 to a cybersecurity event monitoring service 120 and/or a threat scoring engine 150. As will be discussed in further detail below, the threat scoring engine 150 may communicate with other threat scoring engines or one or more of the other components of the environment 100 across electronic network 130.

In some embodiments, the threat scoring engine 150 may comprise a server 153, an internal database 151, a first trained machine learning model 154, and a processor 152. The threat scoring engine 150 may be integrated with, or separate from (but connected to or otherwise in communication with), a GUI 160. The GUI 160 may be implemented on any device capable of visual or tactile presentation of data and images in a form intelligible to a user. In some embodiments, the GUI 160 may present information dynamically in a visual medium. In some other embodiments, the GUI 160 may support a tactile display (display that may be felt by the fingers—and intended for the visually impaired) of data and images. In some embodiments, the GUI 160 supporting a tactile display may further be audio-enabled, such that parameter elements are associated with one or more sounds (e.g., musical tones, filtered noises, recorded sound effects, synthesized speech, and the like), in order to further assist a visually impaired user utilizing the display. Non-limiting examples of the display on which the GUI 160 is implemented may include a cathode ray tube, a liquid crystal display, a light emitting display, a plasma display, etc. In some embodiments, the GUI 160 may also accept user inputs. In these embodiments, the GUI 160 may be implemented on a device that may include a touch screen where information may be entered by selecting one of multiple options presented on the display. Selecting an option may be accomplished using a mouse (as is well known in the art), or touching an area of the display. In some embodiments, GUI 160 may be implemented on two or more displays in communication with the threat scoring engine 150. As will be discussed in further detail below, the threat scoring engine 150 may communicate with one or more of the other components of the environment 100 across electronic network 130.

The cybersecurity event monitoring service may comprise a processor 122, a scanner 121, a server 123, and a second trained machine learning model 124. The cybersecurity event monitoring service 120 may generate cybersecurity event data 125 which is transmitted to threat scoring engine 150. The cybersecurity event monitoring service 120 may additionally receive training score data 135 which may be used to train or input into second trained machine learning model 124 as described further herein. While a cybersecurity event monitoring service 120 and threat scoring engine 150 are shown as separate in FIG. 1, in some embodiments, the threat scoring engine 150 may implement both functions such that a cybersecurity event monitoring service 120 separate from the threat scoring engine 150 is not necessary. For example, the threat scoring engine 150 may include server 123, scanner 121, and second trained machine learning model 124 in addition to the server 153, threat actor database, and the first trained machine learning model 154. Further, in various embodiments, any suitable distribution or combination of the aforementioned components and/or other components may be used.

In some embodiments, the components of the environment 100 are associated with a common entity, e.g., a financial institution, transaction processor, merchant, business enterprise, government agency, or the like. In some embodiments, one or more of the components of the environment is associated with a different entity than another. The systems and devices of the environment 100 may communicate in any arrangement. As will be discussed herein, systems and/or devices of the environment 100 may communicate with one or more other systems in order to one or more of generate, train, or use a machine-learning model to monitor and evaluate cybersecurity threat actors, among other activities.

The threat scoring engine 150 may be configured to enable a user to access and/or interact with other systems in the environment 100, e.g., via the GUI 160. For example, the threat scoring engine 150 may be connected to a computer system such as, for example, a desktop computer, a mobile device, a tablet, etc. In some embodiments, the threat scoring engine 150 may interact with one or more electronic application(s), e.g., a program, plugin, browser extension, etc., installed on a memory of the computer system connected to the threat scoring engine 150. In some embodiments, the electronic application(s) may be associated with one or more of the other components in the environment 100. For example, the electronic application(s) may include one or more of system control software, system monitoring software, software development tools, etc.

In various embodiments, threat scoring engine 150 may include one or more additional components, such as an electronic data system, computer-readable memory such as a hard drive, flash drive, disk, etc. In some embodiments, the threat scoring engine 150 includes and/or interacts with an application programming interface for exchanging data to other systems, e.g., one or more of the other components of the environment 100. The internal database 151 of the threat scoring engine 150 may include and/or act as a repository or source for threat actor data, for example, cybersecurity event data associated with a threat actor, as discussed in more detail below.

In various embodiments, the electronic network 130 may be a wide area network ("WAN"), a local area network ("LAN"), personal area network ("PAN"), or the like. In some embodiments, electronic network 130 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

As discussed in further detail below, the threat scoring engine 150 may one or more of (i) generate, store, train, or use a machine-learning model configured to generate a threat actor score associated with a threat actor and/or (ii) generate, store, train, or use a machine-learning model configured to predict relevant risk information in a public data set associated with a threat actor. Relevant risk information may include, for example, data that impacts one or more threat actor scores as discussed further below. The threat scoring engine 150 may include a machine-learning model and/or instructions associated with the machine-learning model, e.g., instructions for generating a machine-learning model, training the machine-learning model, using the machine-learning model etc. The threat scoring engine 150 may include instructions for retrieving threat actor data, adjusting threat actor data, e.g., based on the output of the machine-learning model, and/or operating the GUI 160 to output threat actor data, e.g., as adjusted based on the machine-learning model. The threat scoring engine 150 may include training data, e.g., information related to one or more threat actors and one or more prior cybersecurity events, and may include ground truth, e.g., prior threat actor score data.

In some embodiments, a system or device other than the threat scoring engine 150 may be used to generate and/or train the machine-learning model. For example, such a system may include instructions for generating the machine-learning model, the training data and ground truth, and/or instructions for training the machine-learning model. A resulting trained-machine-learning model may then be provided to the threat scoring engine 150.

Generally, a machine-learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine-learning model, e.g., compare the output of the trained model with the ground truth for that portion of the training data to evaluate an accuracy of the trained model. The training of a first machine-learning model may be configured to cause the machine-learning model to learn associations between test data that includes information related to one or more threat actors and one or more prior cybersecurity events and ground truth data that includes one or more threat actor scores corresponding to the one or more threat actors and one or more prior cybersecurity events associated with the one or more threat actors, such that the first trained machine-learning model is configured to determine an output updated threat actor score associated with a threat actor in response to the input cybersecurity event data and threat actor data based on the learned associations. The training of a second machine-learning model may be configured to cause the machine-learning model to learn associations between test data that includes information regarding one or more threat actors and a prior threat actor score for each of the one or more threat actors and ground truth data that includes risk information corresponding to the one or more threat actors, such that the trained machine-learning model is configured to determine an output risk information associated with the threat actor in response to the input threat actor data and the threat actor score for the threat actor data based on the learned associations. In this manner, the second trained machine learning model is used to automatically scan and parse public data for risk information (e.g., information that is relevant for generating one or more threat actor scores for a threat actor). In some embodiments, a combined machine learning model may include features of the first and second machine learning models.

Although depicted as separate components in FIG. 1, it should be understood that a component or portion of a component in the environment 100 may, in some embodiments, be integrated with or incorporated into one or more other components. For example, a portion of the GUI 160 may be integrated with internal database 151 or the like. In another example, the threat scoring engine 150 may be integrated with the internal database 151. In some embodiments, operations or aspects of one or more of the components discussed above may be distributed amongst one or more other components. Any suitable arrangement and/or integration of the various systems and devices of the environment 100 may be used. As another example, threat scoring engine 150 may include the cybersecurity event monitoring service 120 and/or the second trained machine learning model 124.

Further aspects of the machine-learning model(s) and/or how they may be utilized to, for example, determine cybersecurity threat actor severity are discussed in further detail in the methods below. In the following methods, various acts may be described as performed or executed by a component from FIG. 1, such as the threat scoring engine 150, the cybersecurity event monitoring service 120, or components thereof. However, it should be understood that in various embodiments, various components of the environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 2:
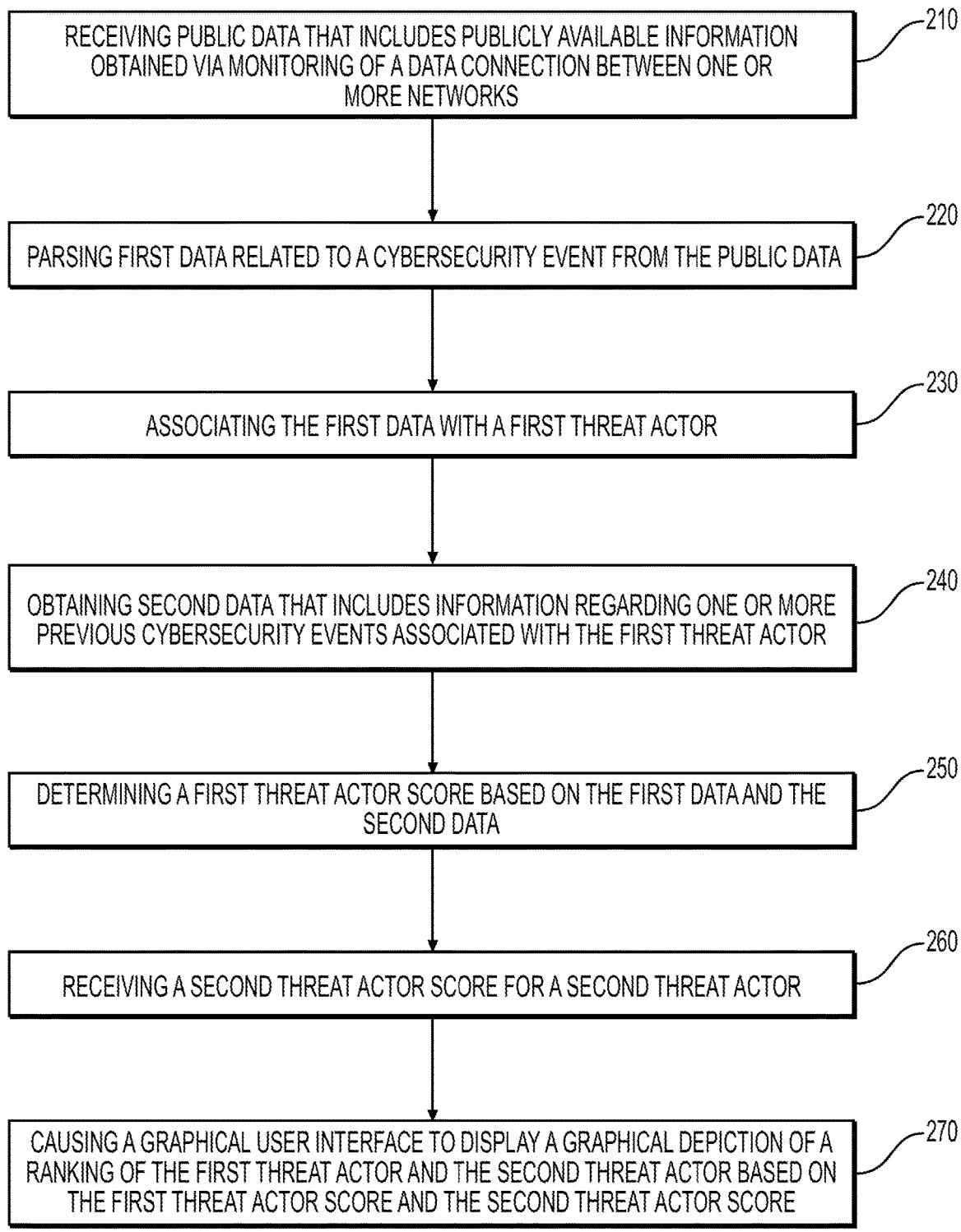
FIG. 2 depicts a flowchart of an exemplary method of cybersecurity threat actor severity scoring, according to one or more embodiments.

FIG. 2 illustrates an exemplary process 200 for threat actor severity scoring, such as in the various examples discussed above. At step 210, the threat scoring engine 150 may receive public data 110. Public data 110 may comprise public (e.g., non-confidential) information obtained via monitoring of a data connection between one or more networks such as electronic network 130. In some embodiments, the electronic network 130 may be a news feed, an application programming interface ("API"), a web crawler, or other similar way of obtaining information. In some embodiments, public data 110 may comprise information regarding a cybersecurity event such as a data breach or data attack. As another example, public data 110 may comprise information regarding a threat actor. At step 220, first data related to a cybersecurity event may be parsed from the public data 110. In some embodiments, a cybersecurity event monitoring service 120 separate from the threat scoring engine 150 may parse the public data 110 to generate cybersecurity event data 125 and transmit the cybersecurity event data 125 to the threat scoring engine 150. In some embodiments, the threat scoring engine 150 may receive the public data 110 directly and parse the first data related to a cybersecurity event. The data related to a cybersecurity event in some embodiments may comprise information regarding the cybersecurity event, including one or more of a threat actor associated with the cybersecurity event, the time of the event, the target(s) associated with the cybersecurity event, and/or damages associated with the event (e.g., compromised data, stolen funds, loss of credibility, and so forth). The data related to a cybersecurity event may include information that impacts one or more threat actor scores as described further herein.

At step 230, the first data may be associated with a first threat actor. For example, the threat scoring engine 150 may analyze the data related to the cybersecurity event and determine a threat actor to associate with the cybersecurity event. In some embodiments, the threat scoring engine 150 may process natural language statements to determine an associated threat actor. In some embodiments, information regarding the threat actor may already be included with the data related to a cybersecurity event. In other embodiments, the threat actor may be unknown within the public data, but an internal analysis by a cybersecurity defense team for an organization may indicate or suggest that a cybersecurity event is likely attributable to the first threat actor.

At step 240, second data may be obtained that includes information regarding one or more previous cybersecurity events associated with the first threat actor. In some embodiments, the second data may be obtained from one or more public database(s) 105 as described in FIG. 1. In other embodiments, the second data may be obtained from an internal or confidential source, such as internal database 151. The second data may be historical information regarding a threat actor collected and stored by an enterprise as part of a cybersecurity team's defense and monitoring. The second data may also include enterprise specific contextual metadata, for example, information provided by an analyst or some other unique input. For example, a security testing team refers to a group that simulates attack tactics, techniques, and procedures to test the cybersecurity capabilities of an organization. A security testing team may conduct a benign cybersecurity attack on an entity (for example, by emulating the types of actions that might be performed by a threat actor when executing a cybersecurity attack) in order to test the ability of an organization to detect the cybersecurity attack, prevent the cybersecurity attack, and/or mitigate damages associated with the attack. Based on the performance of the organization against those actions, enterprise specific contextual metadata may be obtained that can then be used to more accurately assess the threat severity risk of a threat actor and/or create an enterprise-specific threat actor score as discussed further below. In this manner, a threat severity score may be generated as provided below that is unique to an enterprise based on internally collected and stored information in addition to information obtained from public data.

At step 250, the threat scoring engine 150 may generate a first threat actor score for a first threat actor based on the first data and the second data. Multiple different threat actor scores are contemplated, for example, a first threat actor intent score, a first threat actor capability score, a first threat actor volume score, and/or a first threat actor recency scores. In some embodiments, a threat actor score may be an overall composite score generated based on a combination of other threat actor scores, for example, an overall composite score may be generated based on an intent score and a capability score for a threat actor. For example, a threat actor score may be an intent score which corresponds to the likelihood that a threat actor will target the specific enterprise. A threat actor score may be also be a capability score, which corresponds to the ability of a threat actor to effectively implement or execute a cybersecurity event. For example, a state/government funded threat actor known for being able to successfully execute sophisticated cyberattacks against well-defended entities may have a higher capability score than another threat actor that is not-well funded or has not successfully executed a cyberattack against a large enterprise or government agency. Another threat actor score may be a volume score, which corresponds to the number of observed or detected cybersecurity events associated with a threat actor. For example, in some embodiments, a threat actor that has observably executed or attempted thousands of cyberattacks over a given time period may have a higher volume score than another threat actor that has only attempted one or two attacks over the same time period. An additional threat actor score may be a recency score, which corresponds to the timing of prior cybersecurity events associated with the threat actor. For example, cybersecurity events associated with a threat actor that occurred within the last year may result in an increased recency score whereas cybersecurity events that occurred four or more years ago may result in a decreased recency score. A composite or total score may also be generated based on one of more of the threat actor scores generated above including the capability, intent, volume, and/or recency scores. According to some aspects, the threat actor score may be an overall composite score that is generated directly based on the first data and the second data, without calculating other threat actor scores.

In some embodiments, other types of threat actor scores may be utilized. For example, a coverage score or protection score may refer to a score relating to the ability or capability of an organization to prevent or mitigate the risks associated with a certain type of threat actor or cybersecurity event. For example, an organization may implement a firewall that provides protection against a certain type of attack associated with a cybersecurity. Thus, an increased coverage score or protection score might, for example, indicate a reduced overall or composite threat actor score associated with a threat actor. Accordingly, by receiving additional data pertaining to a type of attack associated with a cybersecurity event, the threat scoring engine 150 may update a threat actor score, such as an overall composite score, based on the coverage score. Another type of threat actor score may be an emulation score. For example, a selected threat actor attack on an organization may be emulated by a security testing team. Based on the results of the attack by the security testing team, an emulation score may be generated. A successful defense against that attack may result in a higher emulation score (and thus, a lower overall threat actor score associated with the threat actor). Similarly, a failure to defend against the attack may result in a lower emulation score. A security testing team may also include a third party tool or software for performing automated threat actor emulations at regularly scheduled intervals (e.g., Mandiant Security Validation or MSV). For example, an organization may have emulations run weekly or monthly in order to regularly test the effectiveness of cyber-security defenses against a particular threat actor. This historical data may then be recorded to also impact the above referenced "coverage" score.

In some embodiments, a threat actor score as described above may be generated in an automated manner based on data as described above. In other embodiments, a threat actor score may also be determined using a guided interface. For example, questions may be generated and presented to a cybersecurity analyst via a GUI, such that answers provided to these questions will allow and/or cause the threat scoring engine 150 to suggest or recommend threat actor scores. In some embodiments, a security testing team could conduct cybersecurity attacks and predict or determine how that would impact the threat actor scores based on the results of the cybersecurity attack. In some embodiments, a threat actor score may be a value between 1 and 6, where a 1 indicates a highest level of risk and a 6 indicates a lowest level of risk. Any suitable schema for scoring may be used in various embodiments.

In some embodiments, the threat actor scores used to generate an overall composite threat actor score may further be weighted, e.g., in order to meet or reflect the needs of an enterprise for more accurate risk assessment of threat actors. For example, a capability score may be weighted such that it is twice as impactful as a recency score with respect to the overall composite threat actor score. In some embodiments, the weights may be generated according to an analytical hierarchy process ("AHP"). For example, under an exemplary analytical hierarchy process, a judgement of the importance of one threat actor score relative to another may be assigned a number on a scale, such as the following:

| Value | Definition of Importance |
|---|---|
| 1 | Equal Importance |
| 3 | Moderate Importance of one factor over another |
| 5 | Strong or essential importance |
| 7 | Very strong importance |
| 9 | Extreme Importance |

For example, using AHP, a capability score may be assigned a value of 1 relative to an intent score, meaning that capability and intent should treated as equally important. On the other hand, the capability score might be assigned a value of 9 (extreme importance) relative to a recency score, meaning that the recency score is significantly less important than the capability score, and accordingly, would be afforded less weight than the capability score. These weights may reflect the importance of a factor to determining risk: the capability of a threat actor in some cases may be far more determinative of risk than the recency of prior attacks by the threat actor.

In some embodiments, the weight associated with a threat actor score may further be calculated based on a scoring criteria. For example, where the threat actor score is a capability threat actor score, the weight may be determined further based on a capability scoring value. For example, a scale from 1 to 6 may be used, where a capability scoring value of 1 indicates a higher level of risk (for example, the threat actor is capable of conducting a targeted network intrusion) whereas a 6 might indicate a lower level of risk (for example, the threat actor merely has the resources or expertise to compromise an individual or customer account). In this example, a capability scoring value of 1 may result in the capability being fully weighted, while a capability scoring value of 6 may result in the capability score being significantly less weighted when determining an overall composite threat actor score for the threat actor. Similarly, a scale from 1-6 may be used for the intent threat actor score, where a 1 indicates a higher level of risk (for example, the threat actor is engaged in an active campaign that is selectively targeting the organization) and a 6 indicates a lower level of risk (for example, the entity has not demonstrated any intent to target the organization).

As an example, in one embodiment, a demonstrated intent value of 2 may be associated with a first threat actor. An intent weight may be determined as described above to be 0.34. The total intent score weighted would then be $2 \times 0.34 = 0.69$. Similarly, a capability value of 1 may also be associated with the first threat actor. A capability weight may be determined as above to also be 0.34. The total capability score weighted would then be $1 \times 0.34 = 0.34$. Further, a volume value of 0 may also be associated with the first threat actor (for example, where there are more than 10 prior attacks). A volume weight may be determined as be 0.10. The total volume score weighted would then be $0 \times 0.10 = 0$. Additionally, a recency value of 3 may also be associated with the first threat actor. A recency weight may be determined as above to be 0.21. The total recency score weighted would then be $3 \times 0.21 = 0.63$. Based on these values, a total raw overall composite score for the threat actor may be $0.69 + 0.34 + 0 + 0.63 = 1.66$. A lower raw total score may indicate that the threat actor has a higher risk severity to an organization, while a higher total raw score may indicate that the threat actor has a lower risk severity to an organization. In some embodiments, this score may be normalized for each threat actor in a set of threat actors for display or ranking, for example, using the equation (raw score–the lowest raw score)/(highest raw score–lowest raw score). In this manner, the threat actor in the set with the highest normalized score (a 1) would pose the lowest risk to the organization, while a threat actor with the normalized score closest to 0 would pose the highest risk to the organization. In other embodiments, any suitable normalization technique may be used.

At step 260, the threat scoring engine may receive a second threat actor score for a second threat actor. In some embodiments, the second threat actor score may be generated according to the principles described above. In some embodiments, the second threat actor score may be obtained, e.g., from the internal database 151 or another source. At step 270, the threat scoring engine 150 may cause a GUI 160 to display a graphical depiction of a ranking of the first threat actor and the second threat actor based on the first threat actor score and the second threat actor score. Exemplary GUIs are explained further below with respect to FIGS. 4-7.

In some embodiments, the process may include using a trained-machine learning model to analyze data in a database to generate a threat actor score or generate an updated threat actor score for a threat actor as described above. In this manner, a technical improvement to a technical problem is provided for more accurately determining relevant risk information in a public data set and ranking threat actors by risk level to a specific organization or enterprise.

In some embodiments, the threat scoring engine 150 may further automatically monitor changes in threat actor scores and update in real-time a user device belonging to a cybersecurity team member upon a change in score. For example, a predetermined threshold may be set for a threat actor (for example an overall composite threat actor score of 2). When the threat scoring engine 150 generates a new threat actor score for a threat actor upon receiving data regarding a new cybersecurity event, the threat scoring engine 150 can determine whether the new or updated threat actor score exceeds the predetermined threshold (in this example, the new or updated overall composite threat actor score is at or below 2). Upon learning that the threat actor score for the threat actor is not at or below 2 (e.g., the threat actor now poses a greater threat than it did previously), the threat scoring engine 150 may notify the cybersecurity team for the organization. For example, the threat scoring engine 150 may transmit an email, push notification, text message, audible notification, or other type of notification to a user device in response to determining that the threat actor score exceeds the predetermined threshold. Similarly, the threat scoring engine 150 may transmit a notification in response to a change in ranking of a plurality of threat actors. For example, when a first threat actor score improves such that its threat actor score now exceeds the score of a second threat actor such that the ranking of the threat actor changes, a notification as above may similarly be transmitted to a user device.

Figure 3:
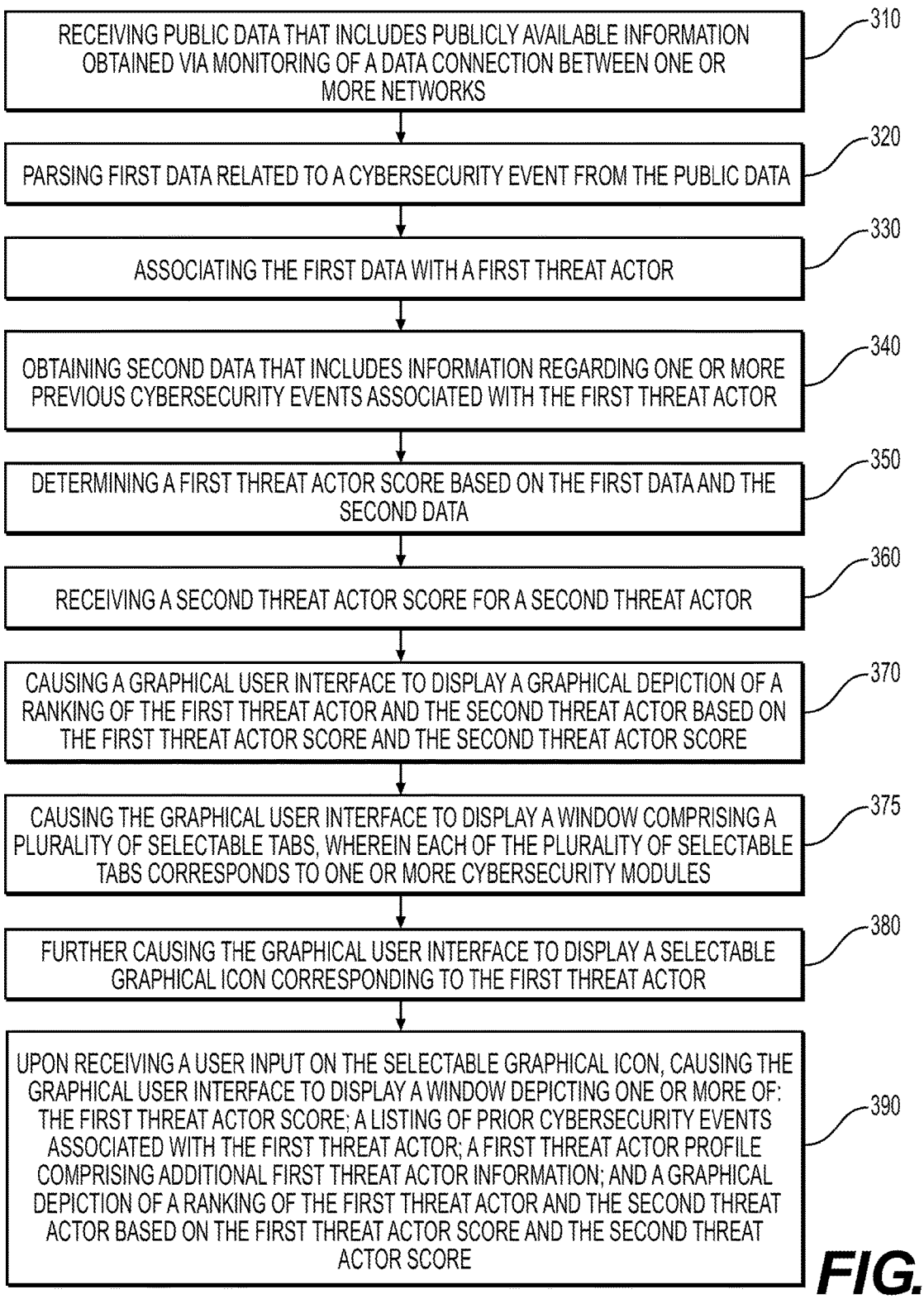
FIG. 3 depicts a flowchart of another exemplary method of cybersecurity threat actor severity scoring, according to one or more embodiments.

FIG. 3 illustrates another exemplary process 300 for threat actor severity scoring, such as in the various examples discussed above. At step 310, public data may be received by the threat scoring engine 150 as described above at step 210 in FIG. 2. At step 320, first data may be parsed from the public data as described above at step 220 with respect to FIG. 2. At step 330, first data may be associated with a first threat actor as described above at step 230 with respect to FIG. 2. At step 240, second data including information regarding previous cybersecurity events may be obtained by the threat scoring engine 150 as described above at step 340 with respect to FIG. 2. At step 350, a first threat actor score may be determined based on the first data and second data as described above at step 250 with respect to FIG. 2. At step 360, a second threat actor for a second threat actor may be received by the threat scoring engine 150 as described above at step 260 with respect to FIG. 2. At step 370, a GUI 160 may display a graphical depiction of a ranking of the first and second threat actors as described above at step 270 with respect to FIG. 2. At step 375, the threat scoring engine 150 may further cause a GUI to display a window comprising a plurality of selectable tabs, wherein the plurality of selectable tabs corresponds to one or more cybersecurity modules. A cybersecurity module may be, for example, a cybersecurity functionality, for example, tools, reports, events, alerts, messages, or other functionalities for cybersecurity. The window that may be displayed on GUI 160 are described in further detail below with respect to FIGS. 4-7. At step 380, the GUI 160 displays a selectable graphical icon corresponding to the first threat actor as shown, for example, in FIG. 7. At step 390, upon receiving a user input on the selectable graphical icon, the GUI 160 may display a new window, for example, one or more of the windows shown and discussed below with respect to FIGS. 4-7. The window may depict one or more of: a first threat actor score, a listing of prior cybersecurity events, a first threat actor profile comprising additional first threat actor information, and/or a graphical depiction of a ranking of the first and threat actor based on the first threat actor score and the second threat actor score.

Figure 4:
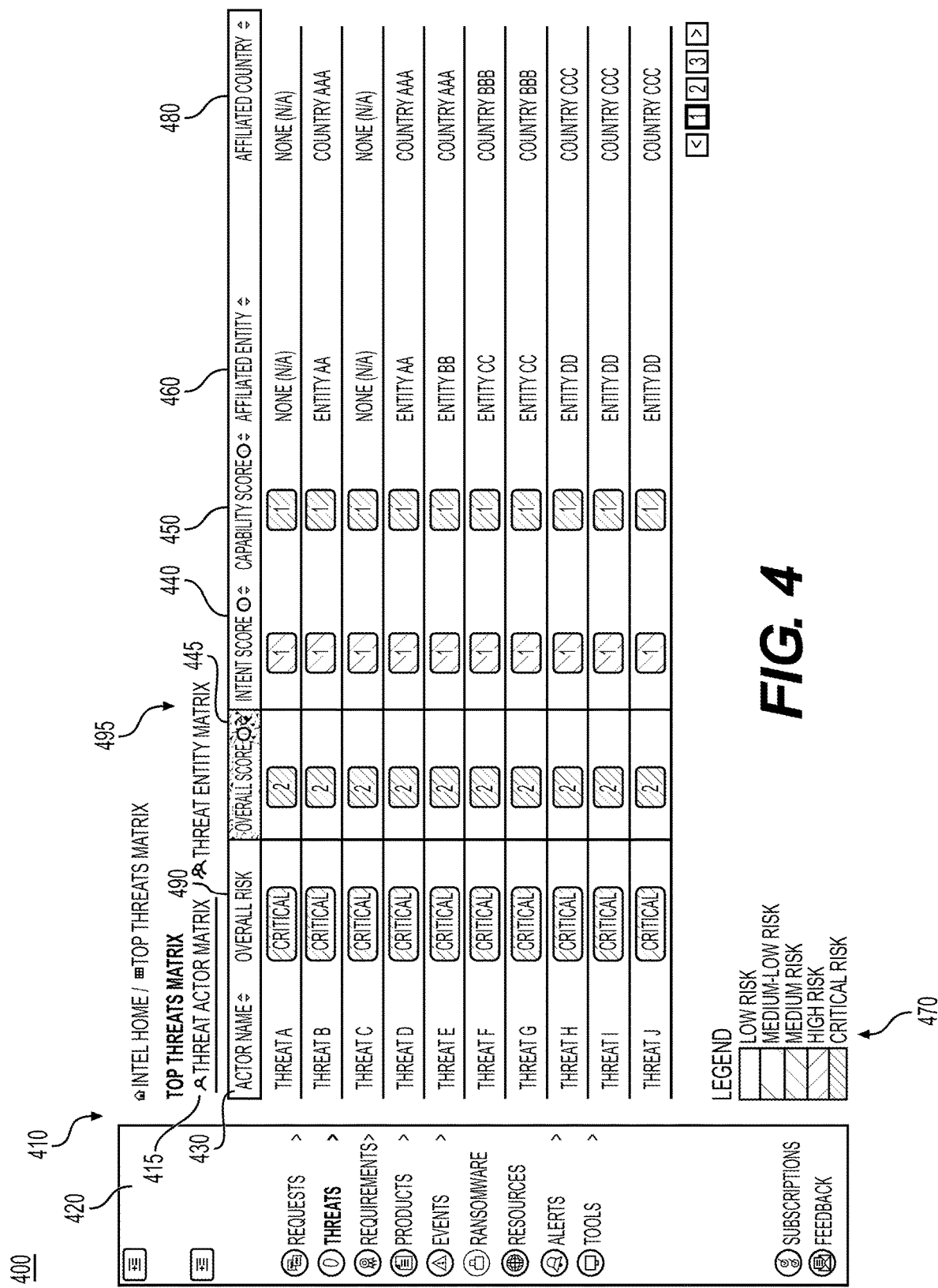
FIG. 4 depicts a graphical user interface displaying a ranking of threat actors based on a threat actor score, according to one or more embodiments.

FIG. 4 depicts a GUI 400 displaying a ranking of threat actors based on threat actor scores, according to one or more embodiments. GUI 400 may comprise a threat actor matrix window 410, a selectable threat actor matrix tab 415, a selectable threat entity matrix tab 495, an interface navigation panel 420, a ranking of threat actors 430, and a legend 470. The interface navigation panel 420 generates additional functionality by allowing a user to select other information or topics relevant to cybersecurity, such as resources, alerts, tools, products, and other information relevant to a user in the context of cybersecurity. Thus, the GUI 400 serves as a portal for a specific enterprise or organization or agency that allows fast access to information that is relevant to cybersecurity. The threat actor matrix window 410 may display corresponding information for each threat actor in the ranking of threat actors 430, including an overall risk designation 490 as well as threat actor scores as described above with respect to FIGS. 1-3 such as a composite score or overall score 445, intent score 440, and/or capability score 450. Overall risk designation 490 may be a natural language statement generated based on the overall composite threat actor score, for example, a "critical" designation indicating an overall composite threat actor score of 2 or below. As another example, a "low" risk designation may be given where the overall composite threat actor score exceeds 4. Other threat actor scores may be displayed as described above. Other information may additionally be displayed, including for example an affiliated entity or an affiliated country associated with each threat actor in the ranking of threat actors 430.

In some embodiments, the threat actors displayed may be filtered, ordered, or rearranged according to threat actor scores or according to other information such as an affiliated entity 460 or an affiliated country 480. In some cases, a particular threat actor may be a subgroup or subset of a larger organization, such that providing an affiliated entity 460 associated with the threat actor may assist with assessing risk severity. Additionally, providing an affiliated country 480 associated with a threat actor may similarly assist with assessing risk severity. In some embodiments, colors may be used in conjunction with legend 470 in order to highlight on the display certain threat actors, values, or other information that result in a higher or lower risk. For example, red may correspond to a critical risk, pink may correspond to a high risk, yellow may correspond to a medium risk, blue may correspond to a medium-low risk, and green may correspond to a low risk. In some embodiments, selecting the selectable threat entity matrix tab 495 will allow display of a ranked list of each affiliated entity 460, which allows the user to look at and rank broader categories or groups of threat actors. For example, by selecting the selectable threat entity matrix tab 495, the GUI 400 may instead display each affiliated entity 460 on a ranked list. Each affiliated entity 460 may be broader classifications and/or parent organizations of a threat actors, for example, Threat B and Threat Da may be separate threat actors but fall under the same affiliated entity (e.g., Entity AA). Similar threat actor scores for each affiliated entity 460 may be generated as described above with respect to FIGS.

1-3. In this manner, an improved graphical user interface is provided for improving visual aspects of the display and allowing a user to more quickly and efficiently find, view, and group relevant threat actor information and cybersecurity risks.

Figure 5A:
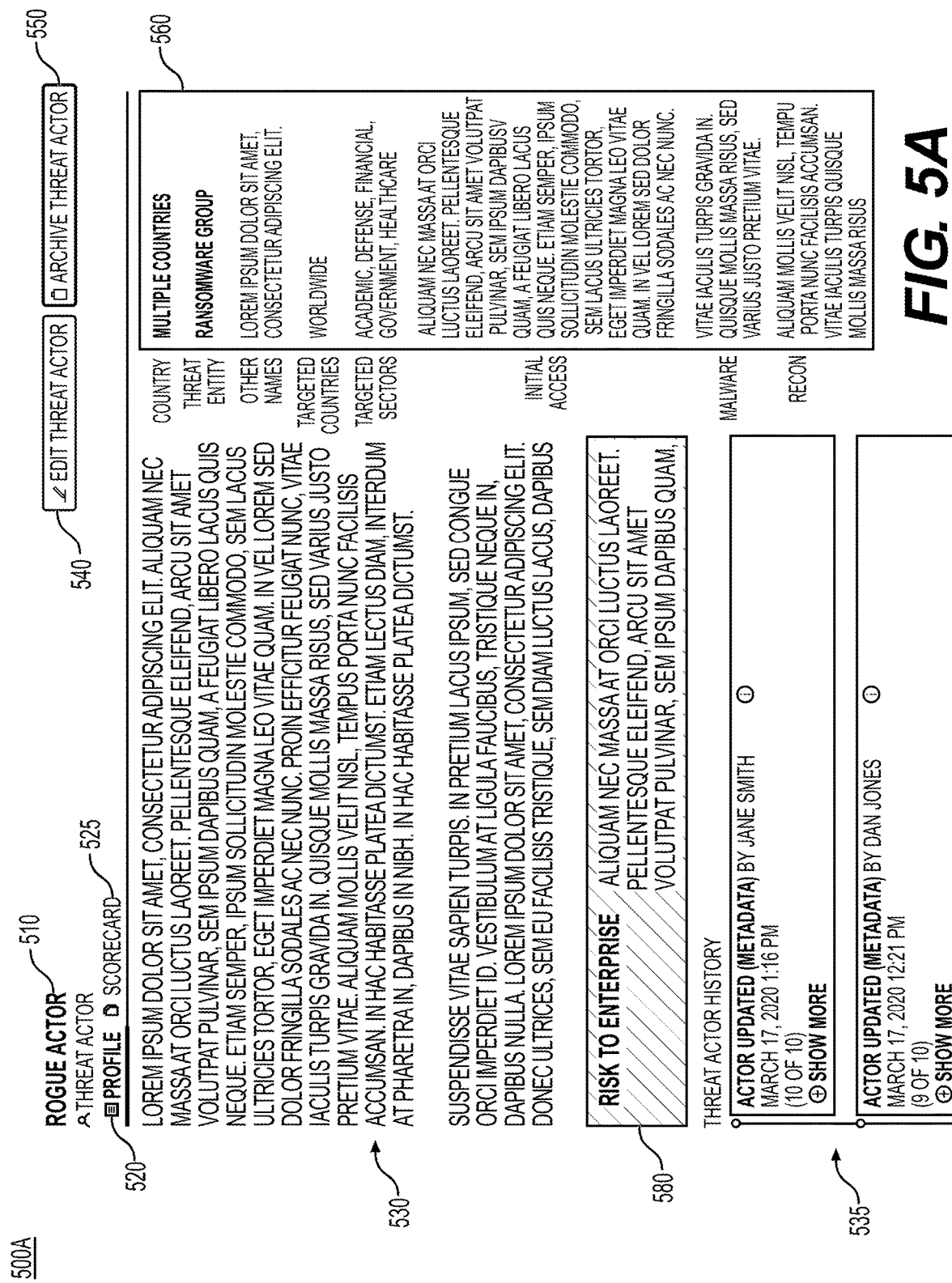
FIGS. 5A-5B depict graphical user interfaces displaying a threat actor profile for a threat actor, according to one or more embodiments.
Figure 5B:
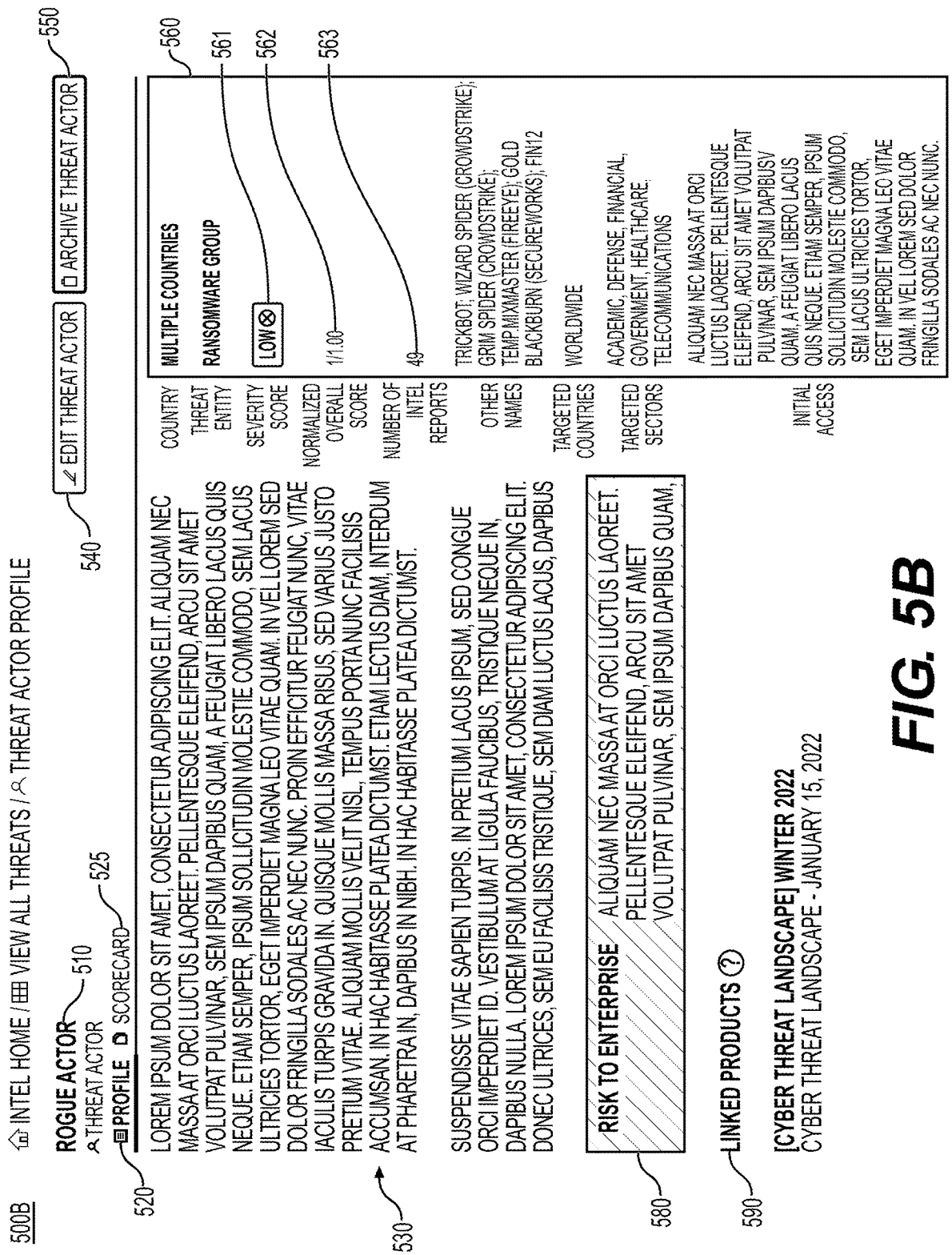

FIGS. 5A-5B depict a graphical user interfaces GUIs displaying threat actor profiles according to one or more aspects of the disclosure. FIG. 5A depicts a GUI 500A displaying a threat actor profile 510 for a selected threat actor, according to one or more embodiments. The threat actor profile 510 may comprise a selectable profile tab 520, a selectable scorecard tab 525, a selectable edit tab 540, and a selectable archive threat actor tab 550. Upon a user selection of the selectable profile tab 520, the threat actor profile 510 for the selected threat actor may be displayed. Upon user selection of the selectable scorecard tab 525, a threat actor scorecard 610 may be displayed as described below with respect to FIGS. 6A-6B. The selectable edit tab 540 may allow a user to edit any information displayed on the threat actor profile 510. The selectable archive threat actor tab 550 may allow a user to archive or remove the selected threat actor entry and information, such that it does not readily appear on the rankings of threat actors. For example, where a threat actor is recently inactive or determined to be of low risk to the enterprise, the threat actor entries may be archived. In some embodiments, the selectable edit tab 540 and the selectable archive threat actor tab 550 may not be accessible or selectable by certain users, for example, users who do not have the required security permissions to access these features.

As shown further in FIG. 5A, upon a user selection of the selectable profile tab 520, the GUI 500A may further display a detailed threat actor information summary 530, a high level risk enterprise risk assessment 580, a threat actor history section 535, and an other relevant information section 560. In some embodiments, the detailed threat actor information summary 530 is manually generated by a cybersecurity analyst or other member of a cybersecurity team for an organization or a third party. In other embodiments, a machine learning model may be trained to generate the detailed threat actor information summary 530 based on other similar summaries that were generated for the same or similar threat actors as well as first and second data as described above with respect to FIG. 2. The threat actor history section 535 may display one or more prior cybersecurity events associated with the selected threat actor, including information regarding the event such as an event summary, a date, time, location, user who entered the information (if applicable) and so forth. Similarly, in some embodiments, the threat actor history section 535 is manually generated by a cybersecurity analyst or other member of a cybersecurity team for an organization or a third party. In other embodiments, a machine learning model may be trained to generate threat actor history section 535 based on other similar summaries that were generated for the same or similar threat actors. In other embodiments, the threat actor history section 535 may be generated by a third party (such as a third party subscription service or news feed). The other relevant information section 560 may provide additional information related to the selected threat actor, including for example an associated entity, country, aliases or other names, targeted sectors or countries, and metadata or other threat actor specific information that is relevant to cybersecurity and assessing the risk severity or background of the selected threat actor FIG. 5B depicts a GUI 500B displaying a threat actor profile according to one or more aspects of the disclosure. GUI 500B, as shown in FIG. 5B, may include one or more features described above with respect to FIG. 5A, including, for example, a selectable profile tab 520, a selectable scorecard tab 525, a selectable edit tab 540, a selectable archive threat actor tab 550, a detailed threat actor information summary 530, a high level risk enterprise risk assessment 580, and an other relevant information section 560. According to aspects of the disclosure, as shown in FIG. 5B, the GUI 500B may include a linked products section 590. The linked products section 590 may include a website url or internal http or html link to one or more other documents or web pages with additional information that includes information regarding a threat actor. The linked products section 590 according to some aspects may include a link to a summary document that includes information regarding multiple threat actors and/or a most recent survey or landscape of cybersecurity threats. In this way, a user may be able to access that document to read more about the threat actor in the context of other threat actors and the landscape of cybersecurity threats, in order to assist the user with making more accurate judgments of risk or threat. The other relevant information section 560 of the GUI 500B may further include a severity score 561, a normalized score 562, and a number of intel reports 563. The severity score 561 may be a natural language statement or other statement describing a risk associated with the threat actor, for example, the severity score may be an overall risk designation 641 described further below with respect to FIGS. 6A-6B. The normalized overall score may be a score determined according to one or more aspects of this disclosure, including for example, the overall composite threat actor score 642 described below with respect to FIGS. 6A-6B. The number of intel reports 563 may be a number of intel reports that involve the threat actor (for example, Rogue Actor). In this manner, the other relevant information section 560 may be customized to provide the most important information at a glance for a user in order to inform the user of the threat severity or risk of a threat actor without needed to click to another page.

Figure 6A:
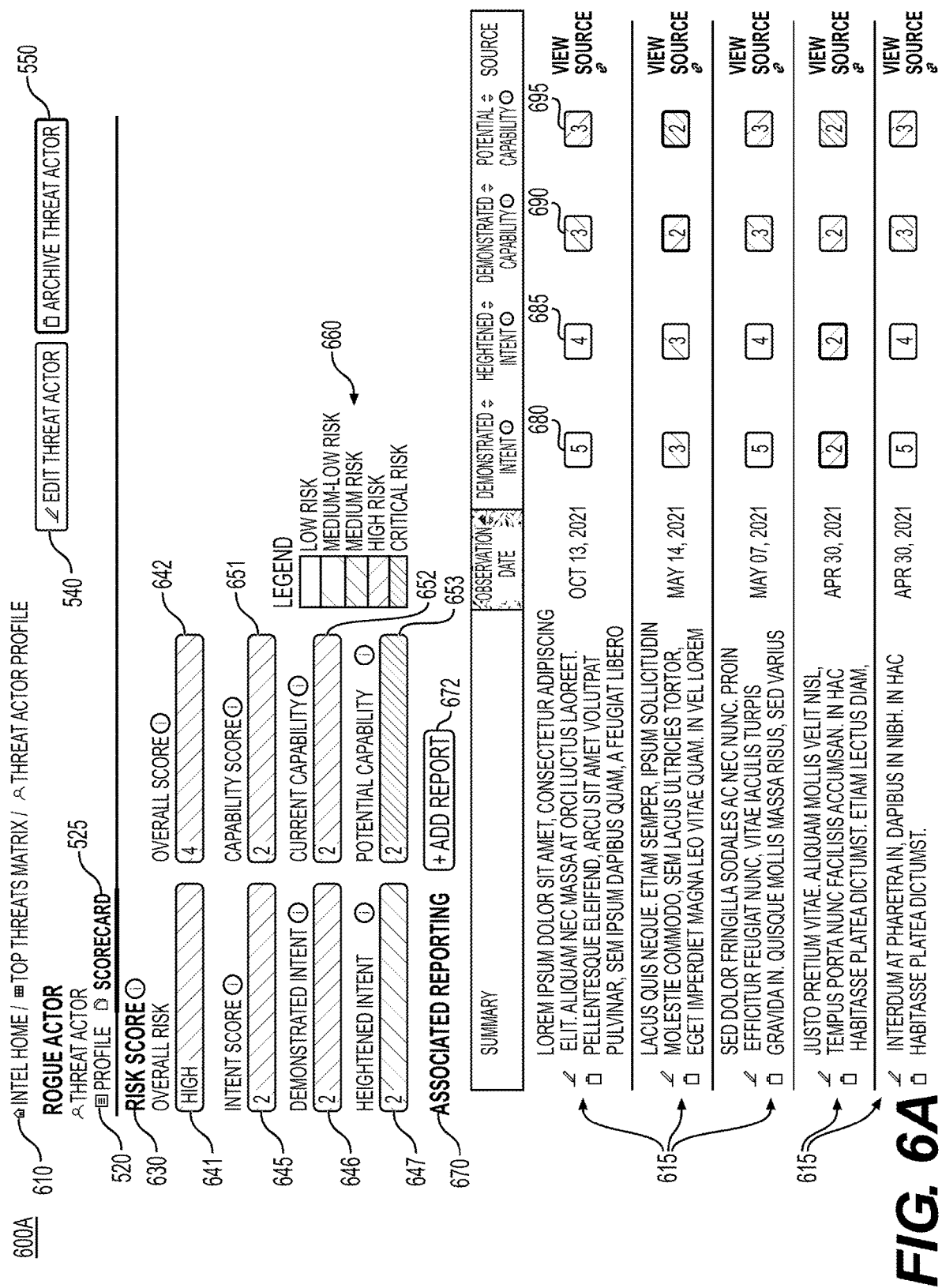
FIGS. 6A-6B depict graphical user interfaces displaying a threat actor scorecard for a threat actor, according to one or more embodiments.
Figure 6B:
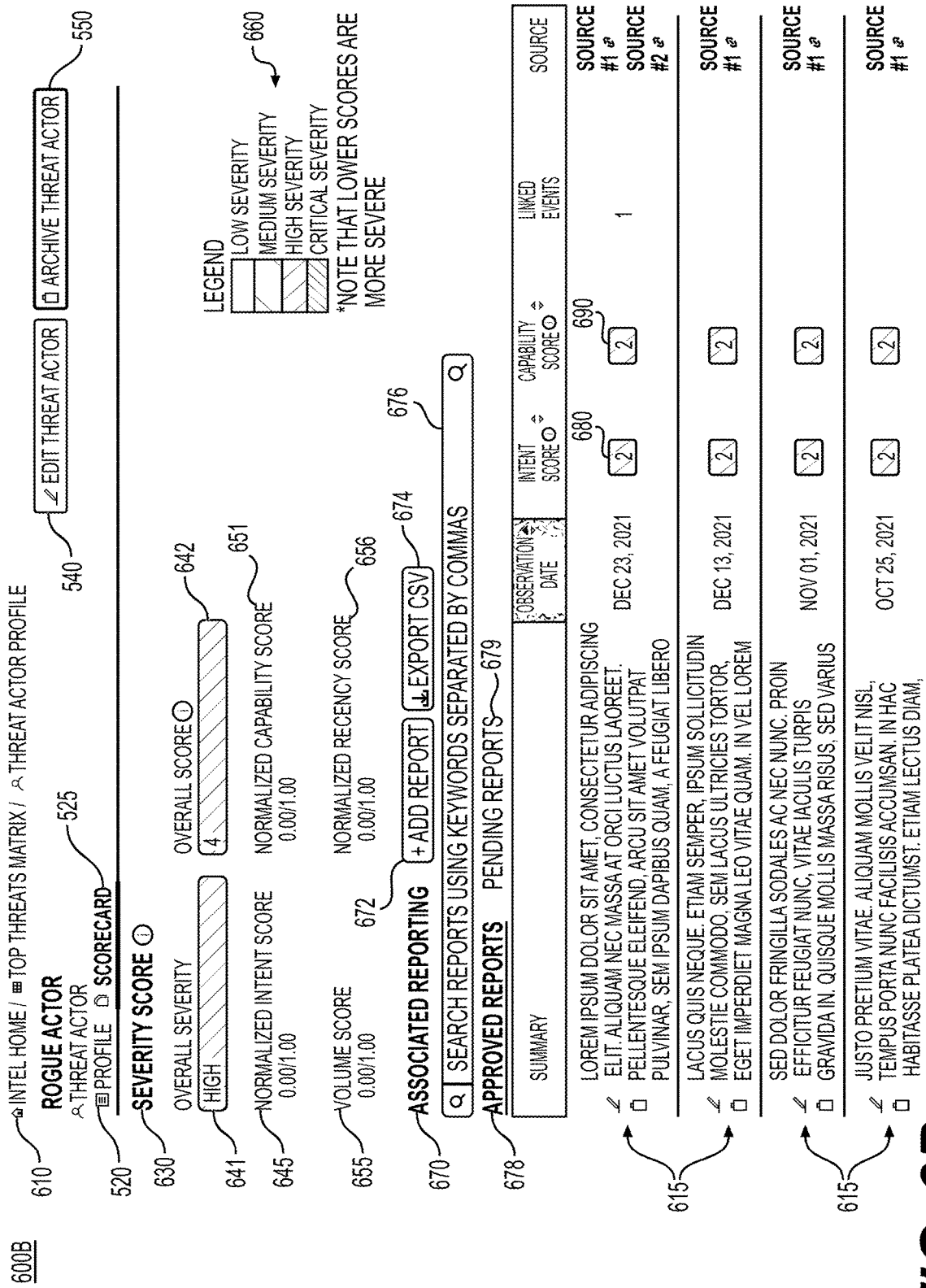

FIGS. 6A-6B depict GUIs displaying threat actor scorecards according to one or more aspects of the disclosure. FIG. 6A depicts a GUI 600A displaying a threat actor scorecard 610 for a selected threat actor, according to one or more embodiments. The threat actor scorecard 610 may comprise a selectable profile tab 520, a selectable scorecard tab 525, a selectable edit tab 540, and a selectable archive threat actor tab 550 as described above with respect to FIGS. 5A-5B. Upon a user selection of the selectable scorecard tab 525, the threat actor scorecard 610 for the selected threat actor may be displayed. The threat actor scorecard 610 may further depict a threat actor score display section 630 for displaying graphical depictions of one or more threat actor scores for the selected threat actor as described above with respect to FIGS. 1-3. For example, the threat actor score display section 630 may comprise graphical or textual indicators representing an overall risk designation 641 (e.g., a "high" risk designation as shown in FIG. 6A and as described above with respect to FIG. 4), an overall composite threat actor score 642, a threat actor intent score 645, a threat actor capability score 651, a threat actor demonstrated intent score 646, a threat actor current capability score 652, a threat actor heightened intent score 647, and a threat actor potential capability score 653. The threat actor scorecard 610 may further include a legend 660, such that the graphical or textual indicators for the one or more threat actor scores may be indicated with colors corresponding to a level of risk, for example, red representing a critical risk or green representing a low risk. The threat actor scorecard 610 may further depict an associated reporting section 670 including a selectable add report tab 672 and one or more cybersecurity event summaries 615. Each of the one or more cybersecurity event summaries 615 represents a cybersecurity event associated with the selected threat actor, and may include a brief summary of the cybersecurity event, the observation date of the event, and one or more threat actor scores for the cybersecurity event. For example, each of the one or more cybersecurity event summaries 615 may include threat actor scores associated with the cybersecurity event, for example, a demonstrated intent score 680, a heightened intent score 685, a demonstrated capability score 690, and/or a potential capability score 695. While threat actor intent scores and threat actor capability scores are discussed in this embodiment, graphical depictions of other threat actor scores such as those described above with respect to FIGS. 1-3 may also be displayed on the threat actor scorecard 610. The selectable add report tab 672 may allow a user to manually input information into the threat actor scorecard 610, including, for example, by adding one or more cybersecurity event summaries 615 to the GUI 600A.

FIG. 6B depicts a GUI 600B displaying a threat actor scorecard 610 for a selected threat actor, according to another aspect of this disclosure. As shown in FIG. 6B, according to aspects of the disclosure, the GUI 600B may comprise features described above with respect to FIG. 6A, including, for example, a threat actor scorecard 610, a selectable profile tab 520, a selectable scorecard tab 525, a selectable edit tab 540, a selectable archive threat actor tab 550, a threat actor score display section 630 (e.g., severity score section), an overall risk designation 641 (e.g., overall severity), an overall composite threat actor score 642 (e.g., overall score), a threat actor intent score 645, a threat actor capability score 651, a legend 660, an associated reporting section 670, a selectable add report tab 672, one or more cybersecurity event summaries 615, a demonstrated intent score 680, and a demonstrated capability score 690. The threat actor score display section 630 of the GUI 600B may further include a volume score 655 and a normalized recency score 656. The volume score 655 may be, for example, a threat actor volume score as described above with respect to step 250 of FIG. 2. The normalized recency score 656 may, according to aspects of the disclosure, be a recency score as described above with respect to step 250 of FIG. 2.

The associated reporting section 670 according to aspects of this disclosure may further comprise a selectable export csv tab 674 and a search bar 676. The selectable export csv tab 674 may be used to export one or more reports (e.g., one or more cybersecurity event summaries 615) into a document that may be used for further analysis. While a csv file is used as exemplary throughout this disclosure, pdf, text, word processing document, spreadsheet, or other documents are within the scope of this disclosure. Search bar 676 may enable a user to search through the one or more cybersecurity event summaries 615 to find information relevant or of interest to the user. Where a threat actor may have thousands of summaries, a user could use search bar 676 to quickly search for summaries relevant to a particular type of threat. For example, the user may be a cybersecurity analyst for an enterprise who has been informed that a threat actor (e.g., Rogue Actor) is actively executing a distributed denial-of-service (DDoS) attack on the enterprise's network. The user may be able to access the threat actor scorecard 610, and then search for DDoS using the search bar 676. The user may see any of the one or more cybersecurity event summaries 615 that include DDoS attacks for Rogue Actor, and based on the intent and capability scores provided, determine the severity of the attack. For example, if a user determines that all prior DDoS attacks by Rogue Actor previously failed (for example, Rogue Actor is not sophisticated enough to damage the Enterprise's networks with DDoS attacks), the user can choose to allocate cybersecurity resources to other tasks. On the other hand, if the user looks at the scores and determines that every past Rogue Actor DDoS attack resulted in significant disruption and damage, the user can escalate and prioritize the enterprise's resources to address the attack. In this manner, the prior data can be quickly leveraged using the interface technology disclosed herein. The associated reporting section 670 may further include a selectable approved reports tab 678 and a selectable pending reports tab 679. According to aspects of the disclosure, the one or more cybersecurity event summaries 615 may not be entered into the scorecard until approved, for example, by a manager or other entity. Reports that are approved may be displayed when the selectable approved reports tab 678 is selected by a user. Cybersecurity event summaries that have been inputted but not approved, may be displayed upon selection of the selectable pending reports tab 679.

FIG. 7 depicts a GUI 700 displaying a ranking of threat entities 760 based on threat actor scores, according to one or more embodiments. The ranking of threat entities 760 may include information including a threat entity 705, a threat actor 715 associated with each of the threat entities, an overall score 720 corresponding to the threat entity 705, threat actor breakdown scores 725 corresponding to each threat actor 710 associated with each threat entity 705, a scorecard 730, and a dynamic profile 735. In some embodiments, each threat entity 705, threat actor 710, overall score 720, threat actor breakdown scores 725, scorecard 730, and dynamic profile 735 may be selectable by a user such that selection of one of the more of the above redirects the user to relevant information associated with the selection. For example, selecting a scorecard 730 such as "Rogue Actor" may result in changing the GUI 700 to display a threat actor scorecard 610 as described above with respect to FIGS. 6A-6B. Similarly, in some embodiments, selecting a dynamic profile 735 for "Rogue Actor" may result in changing the GUI 700 to display a threat actor profile 510 as described above with respect to FIGS. 5A-5B. In some embodiments, graphical indications of a value such as the overall score 720 may include color, for example, red to indicate a high level of risk or green to indicate a low level of risk.

FIG. 8 depicts a graphical user interface GUI 800 displaying a threat actor events list 810, according to one or more aspects of the disclosure. The GUI, as shown in FIG. 8, may comprise the threat actor events list 810, a search bar 815, a selectable create event tab 830, a selectable export csv tab 835, a selectable all events tab 820, a selectable early bird events tab 825, an event status indicator 840, an event created date 842, an event summary 850, an event type 870, and an event reference 860. The threat actor events list 810 may comprise a listing of all threat actor events for an enterprise, ordered by time. This allows a user to quickly see all of the most recent attacks that have occurred along with relevant information for each attack on the GUI 800. For example, upon selecting the selectable all events tab 820, recent events and information related to those events will be displayed. For example, the information may include an event status indicator 840 for an event, which may indicate, for example, "monitoring" where analysts or a system is actively reviewing the event threat. If an event is old or has concluded, the event status indicator 840 may indicate "closed" or "not monitoring" or a similar indication that that an event is not being monitored. The information may also include an event created date 842, to indicate when a threat may have been discovered or reviewed by a cybersecurity team or by the threat scoring engine 150. An event summary 850 may include a high level summary or description of the threat actor event, while event type 870 may be a type or category for the threat actor event (e.g., DDoS attack, phishing attack, and so forth). The event reference 860 may provide a link, document, or other source that provides additional information regarding the corresponding threat actor event, and according to some aspects, may be selectable such that a used can select the event reference 860 to automatically be directed to a corresponding page or document for the threat actor event. The selectable create event tab 830 may be used to input a new threat actor event on the threat actor events list 810. The selectable export csv tab 835 may be used to export or generate a text or csv (or other file) that includes one of more (or all) of the listed threat actor events. The search bar 815 may be used by a user to search for key words, phrases, portions of words, numbers, characters, and so forth, within the threat actor events list 810 to find relevant events to the user. Using the search bar 815, the user can find events related to a particular threat actor, a type of event, or based on other search criteria. The GUI 800 may also include a selectable early bird events tab 825, which may be used to filter the events list to show only certain events that relate to a particular category or group, for example "early bird events." According to some aspects, the GUI 800 may additionally include a selectable view tab 880 for one of more of the threat actor events listed on the threat actor events list 810. Upon selection of the selectable view tab 880, an event details page, such a threat actor event details page 910 described below with respect to FIG. 9, may be displayed.

FIG. 9 depicts a graphical user interface GUI 900 displaying a threat actor event details page 910 for a threat actor event, according to one or more aspects of the disclosure. The GUI 900 may comprise a threat actor event details page 910, an actions section 920, a linked events section 930, an event details section 940, and a history section 950. The actions section 920 may comprise one or more buttons that may be selected for the threat actor event. For example, selectin a "subscribe to this event" button may allow a user to subscribe to the threat actor event via a user device, such that the user may receive updates whenever details regarding the threat actor event change or are modified. A user may modify or change their existing subscriptions via another button, for example, selection of a manage event subscriptions button. The user may also edit the event via the actions section 920, for example, by selecting an edit event metadata button to edit metadata for the threat actor event, an add event notes button to add additional notes or comments to the threat actor event details page 910, a create a product button to generate a separate document or webpage that includes information from event details section 940, a close event button to leave or delete the threat actor event details page 910, and/or an archive event button to archive the threat actor event details page 910 such that it is stored for potential later activity or changes. The threat actor event details page 910 may include an event details section 940 that includes detailed information regarding the threat actor event along with relevant information for a user viewing the page such as an event description, the date of creation, the assigned analyst, the event owner or manager, and so forth.

The threat actor event details page 910 may also include a linked events section 930, which may share one or more other prior events that appear to be related to the threat actor event. The history section 950 may include information regarding the history of the threat actor event, including responses taken, results or damage from the threat actor event, a status of the threat actor event such as whether the activities have been reported to law enforcement, and so forth.

It should be understood that embodiments in this disclosure are exemplary only, and that other embodiments may include various combinations of features from other embodiments, as well as additional or fewer features. For example, while some of the embodiments above pertain to cybersecurity threat actor severity scoring, any suitable activity may be used. In an exemplary embodiment, instead of or in addition to cybersecurity threat actor severity scoring, the claims may include generating scores for evaluating entities or organizations and displaying information based on the scores.

In general, any process or operation discussed in this disclosure that is understood to be computer-implementable, such as the processes illustrated in FIGS. 2 and 3, may be performed by one or more processors of a computer system, such any of the systems, devices, or engines in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 10:
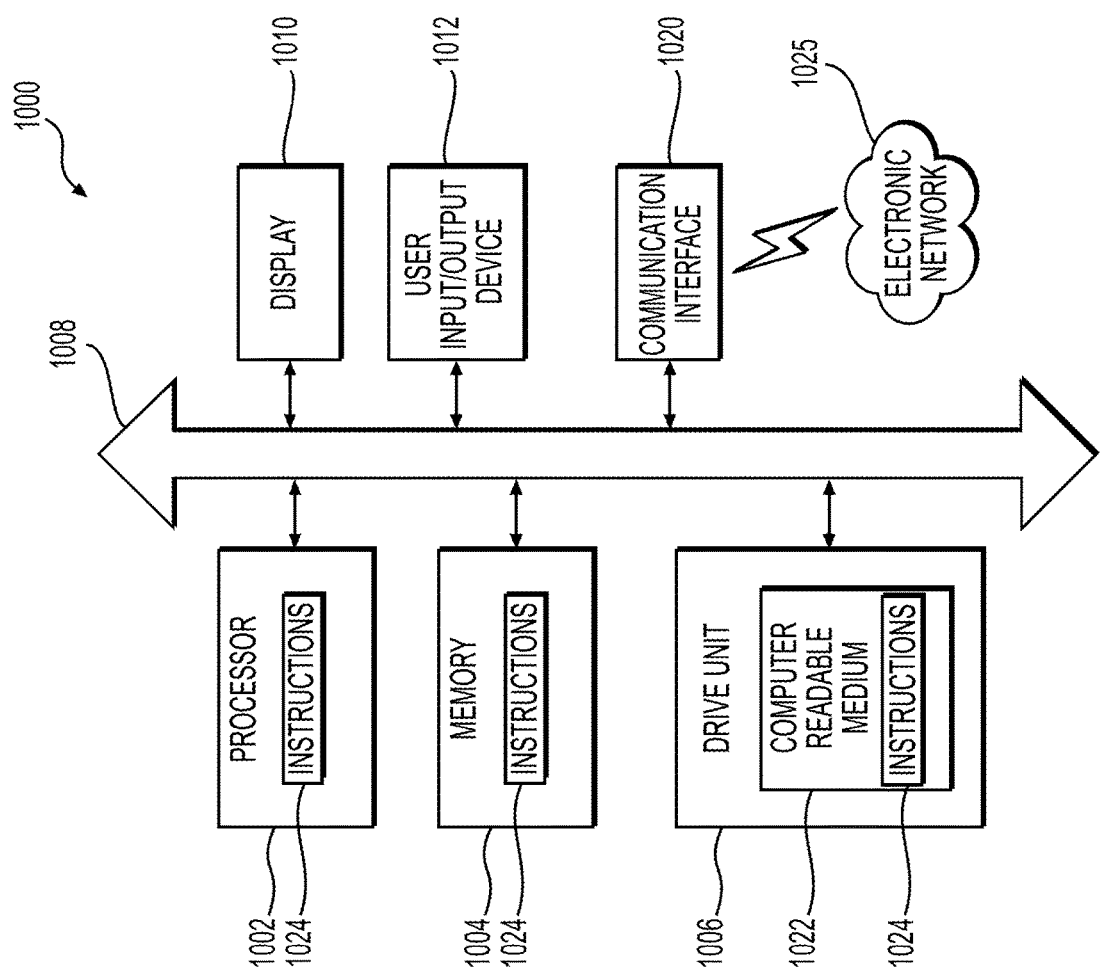
FIG. 10 depicts an example of a computing device, according to one or more embodiments.

FIG. 10 is a simplified functional block diagram of a computer 1000 that may be configured as a device for executing the methods of FIGS. 2 and 3, according to exemplary embodiments of the present disclosure. For example, the computer 1000 may be configured as the threat scoring engine 150, cybersecurity event monitoring service 120, and/or another system according to exemplary embodiments of this disclosure. In various embodiments, any of the systems herein may be a computer 1000 including, for example, a data communication interface 1020 for packet data communication. The computer 1000 also may include a central processing unit ("CPU") 1002, in the form of one or more processors, for executing program instructions. The computer 1000 may include an internal communication bus 1008, and a storage unit 1006 (such as ROM, HDD, SDD, etc.) that may store data on a computer readable medium 1022, although the computer 1000 may receive programming and data via network communications. The computer 1000 may also have a memory 1004 (such as RAM) storing instructions 1024 for executing techniques presented herein, although the instructions 1024 may be stored temporarily or permanently within other modules of computer 1000 (e.g., processor 1002 and/or computer readable medium 1022). The computer 1000 also may include input and output ports 1012 and/or a display 1010 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for cybersecurity threat actor severity scoring, the method comprising:
   receiving, by one or more processors, public data that includes publicly available information obtained via monitoring of a data connection between one or more networks;
   parsing, by the one or more processors, first data related to a cybersecurity event from the public data;
   associating, by the one or more processors, the first data with a first threat actor;
   obtaining, by the one or more processors, second data that includes information regarding one or more previous cybersecurity events associated with the first threat actor;
   determining, by the one or more processors, a first threat actor score based on the first data and the second data, the first threat actor score based partially on a defensive success rate against an attack by the first threat actor;
   receiving, by the one or more processors, a second threat actor score for a second threat actor; and
   causing, via the one or more processors, a graphical user interface to display a graphical depiction of a ranking of the first threat actor and the second threat actor based on the first threat actor score and the second threat actor score.

2. The computer-implemented method of claim 1, further comprising:
   receiving, by the one or more processors, third data that includes information regarding the first threat actor; and
   predicting, via a trained machine learning model executed by the one or more processors and based on the third data, risk information in a public data set associated with the first threat actor, wherein the trained machine learning model is trained, based on (i) fourth data that includes information regarding one or more threat actors and a prior threat actor score for each of the one or more threat actors as test data and (ii) fifth data that includes risk information corresponding to the one or more threat actors, to learn associations between the test data and the risk information corresponding to the one or more threat actors, such that the trained machine learning model is configured to use the learned associations to determine the risk information associated with the first threat actor in response to input of the third data and the first threat actor score for the first threat actor.

3. The computer-implemented method of claim 1, further comprising:
   receiving, by the one or more processors, third data that includes information related to the first threat actor; and
   generating, via a trained machine learning model executed by the one or more processors and based on the third data, an updated first threat actor score associated with the first threat actor based on (i) fourth data that includes information related to one or more threat actors and one or more prior cybersecurity events as test data and (ii) fifth data that includes one or more threat actor scores corresponding to the one or more threat actors and one or more prior cybersecurity events associated with the one or more threat actors, to learn associations between the test data and the one or more threat actor scores corresponding to the one or more threat actors, such that the trained machine learning model is configured to determine the updated first threat actor score associated with the first threat actor in response to input of the third data and the cybersecurity event.

4. The computer-implemented method of claim 1, wherein the first threat actor score includes one or more of a first threat actor intent score, a first threat actor capability score, a first threat actor volume score, or a first threat actor recency score.

5. The computer-implemented method of claim 1, wherein the first threat actor score is generated based on a first threat actor intent score, a first threat actor capability score, a first threat actor volume score, and a first threat actor recency score.

6. The computer-implemented method of claim 5, wherein the first threat actor score is further generated based on one or more weights, wherein each of the one or more weights is generated based on an analytical hierarchy process.

7. The computer-implemented method of claim 1, further comprising:
   receiving, by the one or more processors, additional data pertaining to a type of attack associated with the cybersecurity event;
   generating, by the one or more processors, a coverage score based on the type of attack, wherein the first threat actor score is further updated based on the coverage score; and
   causing, via the one or more processors, the graphical user interface to display the coverage score.

8. The computer-implemented method of claim 1, further comprising:
   generating, by the one or more processors, a threat actor information summary for a first threat actor based on the first data and the second data, wherein generating the threat actor information summary includes generating natural language statements; and
   causing, via the one or more processors, the graphical user interface to display a graphical depiction of the threat actor information summary.

9. The computer-implemented method of claim 1, further comprising:
   causing, via the one or more processors, the graphical user interface to display a window comprising a plurality of selectable tabs, wherein each of the plurality of selectable tabs corresponds to one or more cybersecurity modules;
   further causing, via the one or more processors, the graphical user interface to display a selectable graphical icon corresponding to the first threat actor; and
   upon receiving a user input on the selectable graphical icon, causing, via the one or more processors, the graphical user interface to display a window depicting information related to the first threat actor, including the first threat actor score, a listing of prior cybersecurity events associated with the first threat actor, and a first threat actor profile comprising additional first threat actor information.

10. The computer-implemented method of claim 1, further comprising:
    determining, by the one or more processors, whether the first threat actor score exceeds a predetermined threshold; and
    in response to a determination that the first threat actor score exceeds a predetermined threshold:
       transmitting, by the one or more processors, a notification to a user device comprising the first threat actor, the first threat actor score, and an indication that the first threat actor score exceeds the predetermined threshold; and
       causing, via the one or more processors, the graphical user interface to display a graphical indication that the first threat actor score exceeds the predetermined threshold.

11. A computer-implemented method for cybersecurity threat actor severity scoring, comprising:
    receiving, by one or more processors, public data that includes publicly available information obtained via monitoring of a data connection between one or more networks;
    parsing, by the one or more processors, first data related to a cybersecurity event from the public data;
    associating, by the one or more processors, the first data with a first threat actor;
    obtaining, by the one or more processors, second data that includes information regarding one or more previous cybersecurity events associated with the first threat actor;
    determining, by the one or more processors, a first threat actor score based on the first data and the second data, the first threat actor score based partially on a defensive success rate against an attack by the first threat actor;
    receiving, by the one or more processors, a second threat actor score for a second threat actor;
    causing, via the one or more processors, a graphical user interface to display a graphical depiction of a ranking of the first threat actor and the second threat actor based on the first threat actor score and the second threat actor score;
    causing, via the one or more processors, the graphical user interface to display a window comprising a plurality of selectable tabs, wherein each of the plurality of selectable tabs corresponds to one or more cybersecurity modules;
    further causing, via the one or more processors, the graphical user interface to display a selectable graphical icon corresponding to the first threat actor; and
    upon receiving a user input on the selectable graphical icon, causing, via the one or more processors, the graphical user interface to display a window depicting one or more of:

the first threat actor score;
a listing of prior cybersecurity events associated with the first threat actor;
a first threat actor profile comprising additional first threat actor information; and
a graphical depiction of a ranking of the first threat actor and the second threat actor based on the first threat actor score and the second threat actor score.

12. The computer-implemented method of claim 11, further comprising:
receiving, by the one or more processors, third data that includes information regarding the first threat actor; and
predicting, via a trained machine learning model executed by the one or more processors and based on the third data, risk information in a public data set associated with the first threat actor, wherein the trained machine learning model is trained, based on (i) fourth data that includes information regarding one or more threat actors and a prior threat actor score for each of the one or more threat actors as test data and (ii) fifth data that includes risk information corresponding to the one or more threat actors, to learn associations between the test data and the risk information corresponding to the one or more threat actors, such that the trained machine learning model is configured to use the learned associations to determine the risk information associated with the first threat actor in response to input of the third data and the first threat actor score for the first threat actor.

13. The computer-implemented method of claim 11, further comprising:
receiving, by the one or more processors, third data that includes information comprising the first threat actor; and
generating, via a trained machine learning model executed by the one or more processors and based on the third data, an updated first threat actor score associated with the first threat actor based on (i) fourth data that includes information comprising one or more threat actors and one or more prior cybersecurity events as test data and (ii) fifth data that includes one or more threat actor scores corresponding to the one or more threat actors and one or more prior cybersecurity events associated with the one or more threat actors, to learn associations between the test data and the corresponding threat actor scores for each of the one or more threat actors, such that the trained machine learning model is configured to determine the updated first threat actor score associated with the first threat actor in response to input of the third data and the cybersecurity event.

14. The computer-implemented method of claim 11, wherein the first threat actor score includes one or more of a first threat actor intent score, a first threat actor capability score, a first threat actor volume score, or a first threat actor recency score.

15. The computer-implemented method of claim 11, wherein the first threat actor score is generated based on a first threat actor intent score, a first threat actor capability score, a first threat actor volume score, and a first threat actor recency score.

16. The computer-implemented method of claim 11, wherein the first threat actor score is further generated based on one or more weights, wherein the each of the one or more weights is generated based on an analytical hierarchy process.

17. The computer-implemented method of claim 11, further comprising:
receiving, by the one or more processors, additional data pertaining to a type of attack associated with the cybersecurity event;
generating, by the one or more processors, a coverage score based on the type of attack;
generating an updated first threat actor score based on the coverage score; and
causing, via the one or more processors, the graphical user interface to display the updated first threat actor score.

18. The computer-implemented method of claim 11, further comprising:
generating, by the one or more processors, a threat actor information summary for a first threat actor based on the first data and the second data, wherein generating the threat actor information summary includes generating natural language statements; and
causing, via the one or more processors, the graphical user interface to display a graphical depiction of the threat actor information summary.

19. The computer-implemented method of claim 11, further comprising:
determining, by the one or more processors, whether the first threat actor score exceeds a predetermined threshold; and
in response to a determination that the first threat actor score exceeds a predetermined threshold:
transmitting, by the one or more processors, a notification to a user device comprising the first threat actor, the first threat actor score, and an indication that the first threat actor score exceeds the predetermined threshold; and
causing, via the one or more processors, the graphical user interface to display a graphical indication that the first threat actor score exceeds the predetermined threshold.

20. A system for cybersecurity threat actor severity scoring, comprising:
a memory storing instructions; and
a processor operatively connected to the memory and configured to execute the instructions to perform operations including:
receiving information regarding a plurality of threat actors;
determining a threat actor score for each threat actor of the plurality of threat actors;
receiving public data that includes publicly available information obtained via monitoring of a data connection between one or more networks;
parsing first data related to a cybersecurity event from the public data;
associating the first data with a first threat actor of the plurality of threat actors;
obtaining second data that includes information regarding one or more previous cybersecurity events associated with the first threat actor and a defensive success rate against the one or more previous cybersecurity events associated with the first threat actor;
receiving third data that includes additional information associated with the first threat actor;
generating, via a trained machine learning model and based on the third data, a first threat actor score associated with the first threat actor based on the first data, the second data and the third data, wherein the trained machine learning model is trained based on (i) fourth data that includes information comprising one or more threat actors and one or more prior cybersecurity events as test data and (ii) fifth data that includes one or more threat actor scores corresponding to the one or more threat actors and one or more prior cybersecurity events associated with the one or more threat actors, to learn associations between the test data and the one or more threat actor scores corresponding to the one or more threat actors, such that the trained machine learning model is configured to determine the first threat actor score associated with the first threat actor in response to input of the third data and the cybersecurity event;

generating a ranked list of the plurality of threat actors based on the determined threat actor score for each of the plurality of threat actors and the first threat actor score; and causing a graphical user interface to display graphical depictions of the ranked list.

\* \* \* \* \*